United States Patent
Kataoka

(10) Patent No.: US 7,072,796 B2
(45) Date of Patent: *Jul. 4, 2006

(54) MODIFICATION RISK DEGREE MEASUREMENT SYSTEM, MODIFICATION RISK DEGREE MEASUREMENT METHOD AND MODIFICATION RISK DEGREE MEASUREMENT PROGRAM

(75) Inventor: Yoshio Kataoka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 10/841,611

(22) Filed: May 10, 2004

(65) Prior Publication Data

US 2004/0210421 A1    Oct. 21, 2004

Related U.S. Application Data

(63) Continuation of application No. 10/205,400, filed on Jul. 26, 2002, now Pat. No. 6,757,639.

(30) Foreign Application Priority Data

Jul. 26, 2001    (JP) ............................ P2001-226730

(51) Int. Cl.
  *G06F 19/00* (2006.01)
(52) U.S. Cl. .................. 702/181; 714/38; 717/124; 717/126; 717/168; 717/100
(58) Field of Classification Search ...................... None
  See application file for complete search history.

(56) References Cited

U.S. PATENT DOCUMENTS

| | | | |
|---|---|---|---|
| 6,219,805 B1 | 4/2001 | Jones et al. | |
| 6,223,143 B1 * | 4/2001 | Weinstock et al. | ............ 703/17 |
| 6,456,928 B1 * | 9/2002 | Johnson | ....................... 701/114 |
| 6,697,762 B1 * | 2/2004 | Bush et al. | .................. 702/182 |
| 6,742,000 B1 * | 5/2004 | Fantasia et al. | .......... 707/104.1 |
| 6,757,639 B1 * | 6/2004 | Kataoka | ..................... 702/181 |
| 6,820,044 B1 * | 11/2004 | Groen et al. | .................... 703/2 |
| 6,895,383 B1 * | 5/2005 | Heinrich | ........................ 705/7 |
| 2002/0066077 A1 | 5/2002 | Leung | |
| 2003/0115511 A1 | 6/2003 | Kubota | |

FOREIGN PATENT DOCUMENTS

| | | |
|---|---|---|
| JP | 03-011427 | 1/1991 |
| JP | 6-175884 | 6/1994 |

(Continued)

OTHER PUBLICATIONS

Rauscher et al., "Gray Box Risk Assessment for Telecommunications Software Modifications", IEEE, 1996.*

(Continued)

*Primary Examiner*—Patrick J. Assouad
(74) *Attorney, Agent, or Firm*—Oblon, Spivak, McClelland, Maier & Neustadt, P.C.

(57) ABSTRACT

A modification risk degree measurement system includes a central processing unit (CPU), a program storage unit, a data storage unit, an input unit performing a control instruction and data input and an output unit performing data output. The extracting module, influence range specifying module, influence degree determining module, risk degree calculating module and re-factoring module are incorporated in the CPU. The extracting module performs extraction processing, the influence range specifying module specifies the influence range, the influence degree determining module determines the influence degree, the risk degree calculating module calculates the risk degree from the influence range and the influence degree, and the re-factoring module provides assistance in re-factoring.

6 Claims, 18 Drawing Sheets

FOREIGN PATENT DOCUMENTS

| | | |
|---|---|---|
| JP | 6-202905 | 7/1994 |
| JP | 7-134664 | 5/1995 |
| JP | 09-016392 | 1/1997 |
| JP | 11-224210 | 8/1999 |

OTHER PUBLICATIONS

Yacoub et al., "A Methodology for Architecture-Level Reliability Risk Analysis", IEEE, 2002.*

* cited by examiner

FIG.18

```
import java.io.*;
public class ReversePoland{
  static int lookahead;
  static FileInputStream inFile;
  static void error(){
    System.out.println("Syntax Error");
  }
  public static boolean isDigit(int token){
    if(token => (int)'0' && token <= (int)'9'){
      return true;
    }else{
      return false;
    }
  }
  public static void match(int token){
    if(lookahead == token){
      try{
        lookahead = inFile.read();
      }catch(IOException e){
        System.out.println("can't input data");
      }
    }else
      error();
  } public static void term(){
    if(isDigit(lookahead)){
      System.out.print((char)lookahead);
      match(lookahead);
    }else{
      error();
    }
  } public static void expression(){
    term();
    while(true){
      switch(lookahead){
        case(int)'+':
          match((int)'+');
          term();
          System.out.print('+');
          break;
        case(int)'-':
          match((int)'-');
          term();
          System.out.print('-');
          break;
        case(int)'*':
          match((int)'*');
          term();
          System.out.print('*');
          break;
        default:
          break;
      }
    }
  }
  public static void main(String args[]){
    try{
      inFile = new FileInputStream(args[0]);
    }catch(FileNotFoundException e){
      System.out.println("file not found");
    }
    try{
      lookahead = inFile.read();
    }catch(IOException e){
      System.out.println("can't input data");
    }
    expression();
    System.out.println();
  }
}
```

FIG.19

```
*** ReversePoland. java. org  Thu May 10 08:34:57 2001
--- ReversePoland. java       Thu May 10 08:36:05 2001
***************
* 6, 10 ** static void error(){
!      System. out. println("Syntax Error") ;
     }
--- 6, 10 ---- static void error(){
!      System. out. println("error : Syntax Error") ;
     }
```

FIG.20

```
*** ReversePoland. java. org  Thu May 10 08:31:21 2001
--- ReversePoland. java       Wed May 9  08:56:31 2001
***************
* 10, 17 ** public static boolean isDigit(int token){
!      if(token >= (int)'0' && token <= (int)'9'){
!        return true ;
!      }else{
         return false ;
       }
     }
--- 10, 17 ---- public static boolean is Digit(int token){
!      if(token < (int)'0' || token > (int)'9'){
         return false ;
+      }else{
+        return true ;
       }
     }
```

MODIFICATION RISK DEGREE MEASUREMENT SYSTEM, MODIFICATION RISK DEGREE MEASUREMENT METHOD AND MODIFICATION RISK DEGREE MEASUREMENT PROGRAM

CROSS REFERENCE TO RELATED APPLICATIONS

This is a Continuation of U.S. patent application Ser. No. 10/205,400, filed Jul. 26, 2002 now U.S. Pat. No. 6,757,693, the entire contents of which are incorporated herein by reference, and which is based upon and claims the benefit of priority from the prior Japanese Patent Application No. P2001-226730, filed on Jul. 26, 2001, the entire contents of which are incorporated herein by reference.

BACKGROUND OF THE INVENTION

1. Field of the Invention

This invention relates to a modification risk degree measurement system, a modification risk degree measurement method and a modification risk degree measurement program, which calculate, as a risk degree, the incidence rate of a possible modification result being caused as a side effect of a modification of in a program when this program is modified 2. Description of the Related Art In a development process of software, the task of modifying a program is inevitable work. Moreover, as one of techniques for modifying the program, a technique called re-factoring is present. Re-factoring technique is a technique for improving the maintainability and extensibility of the existing program, and aims to modify module configuration, class configuration and the like without modifying a performing function of the existing program and to impart greater stability to the program.

What is always a problem in the work of modifying a program as described above is a point that, as a result of the modification in many cases, not only a modification result intended by a programmer (object modification result) is derived, but also a subordinate result not intended by the programmer (side effect result) is generated.

Various techniques have been developed in order to investigate how the side effect result generated in the work of modifying the existing program can be estimated and avoided and determine in which region of the existing program the side effect result will be generated in a case where the side effect result cannot be avoided. For example, in order to investigate the influence relationships of the respective elements in a program on this problem, a technique called "slicing" has been frequently used (See Japanese Patent Laid-Open (Kokai) No. 1994-202905, No. 1994-175884 and No. 1995-134664). "Slicing" refers to a technique for extracting a part calculating functions to be modified and unmodified functions from the existing program by use of dependency relationships and control dependency relationships in the program during modification. Meanwhile, with a view to measuring the relationships between the respective elements of the program, a technique of measuring a cohesion degree has been proposed (See Japanese Patent Laid-Open No. Hei 11 (1999)-224210). The cohesion degree indicates the extent to which function constitutional units of the program, that is, functions, methods and the like, are functionally independent, and indicates the properties of a single constitutional element unit. Quantitative evaluation of this index is broadly divided into seven stages, and the highest stage is called a "functional cohesion degree," which indicates a program function constitutional unit capable of being provided by a single function. As a weaker cohesion degree, for example, there is a "chronological cohesion degree," which indicates a function or the like aggregated by initialization processing. The weakest stage is called a "cryptic cohesion degree," which indicates a program function constitutional unit where two or more unrelated functions are aggregated into one function. If the cohesion degree is used as described above, then the functions of the function and the method are measured, and quality of the program can be shown as an objective numerical value.

However, with regard to the slicing technique, though modification can be performed so as not to influence unmodified function, there have been incidences of the case where a portion to be modified is influenced by an unmodified portion therefore proper modification cannot be performed. Moreover, the obtained results have only investigated the existence of an influence relationship among the respective elements. And because it has not been possible to measure the influence degree, it has not been possible for the result of slicing to be a judgment criterion for determining a policy regarding modifying the existing program.

With regard to the technique for measuring a cohesion degree, in the work of modifying the existing program, whether or not the cohesion degree procedures are tight is not directly related to modify in the program. If the cohesion degree of the procedures is high, whether or not the measurement technique is suitable for the modifying work has not been able to be explained accurately.

Moreover, the sole solution is not present in the re-factoring plan, and there may be multiple re-factoring plans, from which a similar effect can be obtained. However, judgments for ranking re-factoring plans present in plural as optimal, suitable, and unsuitable and the like are not easy. As a result, though effectiveness of the re-factoring of the program has been recognized by general users, it has been rare that the re-factoring had been actually applied.

As described above, according to the related art, when the existing program is modified, though it is possible to estimate the side effect results of the program such as the generation of new bugs, caused by the modification, it has been difficult to measure this side effect result as an objective influence degree and to obtain information to serve as an index for flexibly planning the program alterations by use of the measurement values.

The present invention was made in consideration of the above-described problems. An object of the present invention is to provide a modification risk degree measurement system, a modification risk degree measurement method and a modification risk degree measurement program, which are capable of measuring influence degrees and influence ranges for the respective plural modification plans, calculating risk degrees from the information of this measurement, and using the risk degrees as indices when the optimal modification plan is selected from among the modification plans present in plural and to provide a modification risk measurement program.

SUMMARY OF THE INVENTION

In order to attain the above-described object, a first aspect of the present invention inheres in a modification risk degree measurement system, including: (A) an extracting module configured to extract a program constituent element from an program as an influenced element, the program constituent element being influenced by program modification data; (B) an influenced element storage unit configured to store the influenced element; (C) an influence range specifying module configured to specify an influence range from the influenced element; (D) an influence range storage unit configured to store the influence range; (E) an influence degree determining module configured to determine a degree of influence on the program by the influenced element; (F) an influence degree storage unit configured to store the degree of influence; and (G) a risk degree calculating unit configured to calculate a modification risk degree of the program by using the influence range and the degree of influence.

According to the modification risk degree measurement system in accordance to the first feature of the present invention, a system for calculating the modification risk degree in consideration of both of the influence degree and the influence range is adopted, and thus it is possible to make risk degree estimation excellent in comparison with a system of considering only one thereof.

A second aspect of the present invention inheres in a program reconstruction support system for assistance to form a plan for program modification, comprising: (A) an extracting module configured to extract a program constituent element from an program as an influenced element, the program constituent element being influenced by program modification data; (B) an influenced element storage unit configured to store the influenced element; (C) an influence range specifying module configured to specify an influence range from the influenced element; (D) an influence range storage unit configured to store the influence range; (E) an influence degree determining module configured to determine a degree of influence on the program by the influenced element; (F) an influence degree storage unit configured to store the degree of influence; (G) a risk degree calculating module configured to calculate a modification risk degree of the program by using the influence range and the degree of influence; and (H) a re-factoring module configured to assist to re-factor a plan for program modification by using information which includes risk degree.

A third aspect of the present invention inheres in a modification risk degree measurement method, including the steps of (A) extracting a program constituent element from a program as influenced element, the program constituent element being influenced by program modification data; (B) storing the influenced element; (C) specifying an influence range from the influenced element; (D) storing the influence range; (E) determining a degree of influence on the program by the influenced element; (F) storing the degree of influence; and (G) calculating a modification risk degree of the program caused by the program modification data, by using the influence range and the influence degree.

A fourth aspect of the present invention inheres in a method for supporting computer program reconstruction, including the steps of: (A) extracting a program constituent element from a program as an influenced element, the program constituent element being influenced by program modification data; (B) storing the influenced element; (C) specifying an influence range from the influenced element; (D) storing the influence range; (E) determining a degree of influence on the program by the influenced element; (F) storing the degree of influence; (G) calculating a modification risk degree of the program caused by the program modification data, by using the influence range and the influence degree; and (H) assisting for re-factoring a plan for program modification by using information which includes risk degree.

A fifth aspect of the present invention inheres a computer readable medium which stored a program for driving and controlling a modification risk degree measurement system for measuring a risk degree by a program modification, the program including: (A) a command for extracting a program constituent element from a program as influenced element, the program constituent element being influenced by program modification data; (B) a command for storing the influenced element; (C) a command for specifying an influence range from the influenced element; (D) a command for storing the influence range; (E) a command for determining a degree of influence on the program by the influenced element; (F) a command for storing the degree of influence; and (G) a command for calculating a modification risk degree of the program caused by the program modification data by using the influence range and the influence degree.

A sixth aspect of the present invention inheres a computer readable medium which stored a program for supporting computer program reconstruction, comprising; (A) instructions for extracting a program constituent element from a program as influenced element, the program constituent element being influenced by program modification data; (B) instructions for storing the influenced element; (C) instructions for specifying an influence range from the influenced element; (D) instructions for storing the influence range; (E) instructions for determining a degree of influence on the program by the influenced element; (F) instructions for storing the degree of influence; (G)instructions for calculating a modification risk degree of the program caused by the program modification data by using the influence range and the influence degree; and (H) instructions for assisting to re-factor a plan for program modification by using information which includes risk degree.

BRIEF DESCRIPTION OF THE DRAWINGS

FIG. 18 is one example of a program according to the embodiment of the present invention.

FIG. 19 is an example in a modification of the program according to the embodiment of the present invention.

FIG. 20 is an example of a modification in the program according to the embodiment of the present invention.

DETAILED DESCRIPTION OF THE INVENTION

Figure 1:
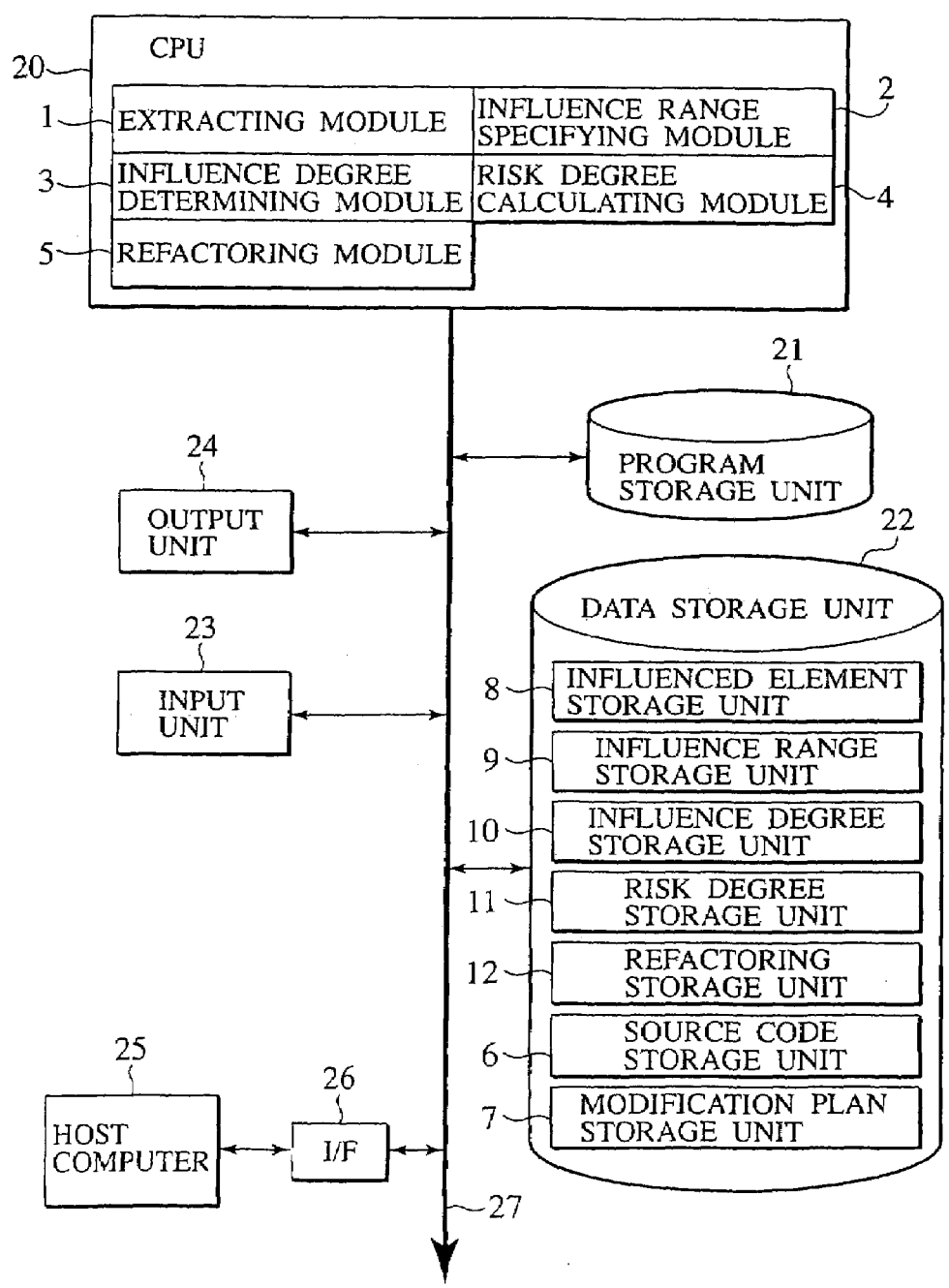
FIG. 1 is a block diagram showing a configuration of a modification risk degree measurement system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details.

Figure 16:
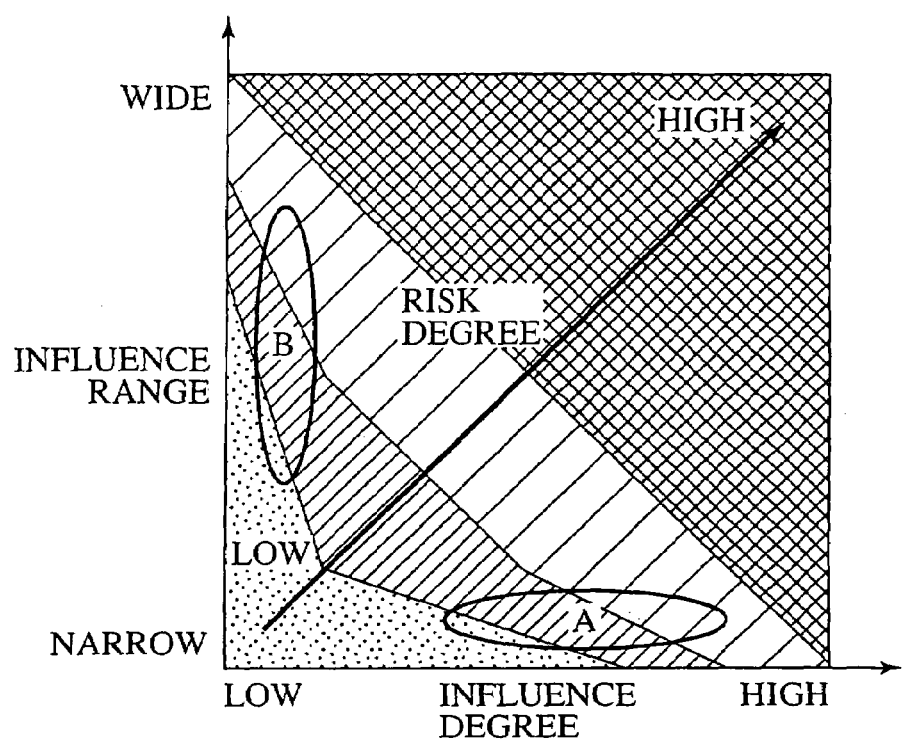
FIG. 16 is an example of displaying two-dimensional parameters of the influence degree and the influence range.
Figure 17:
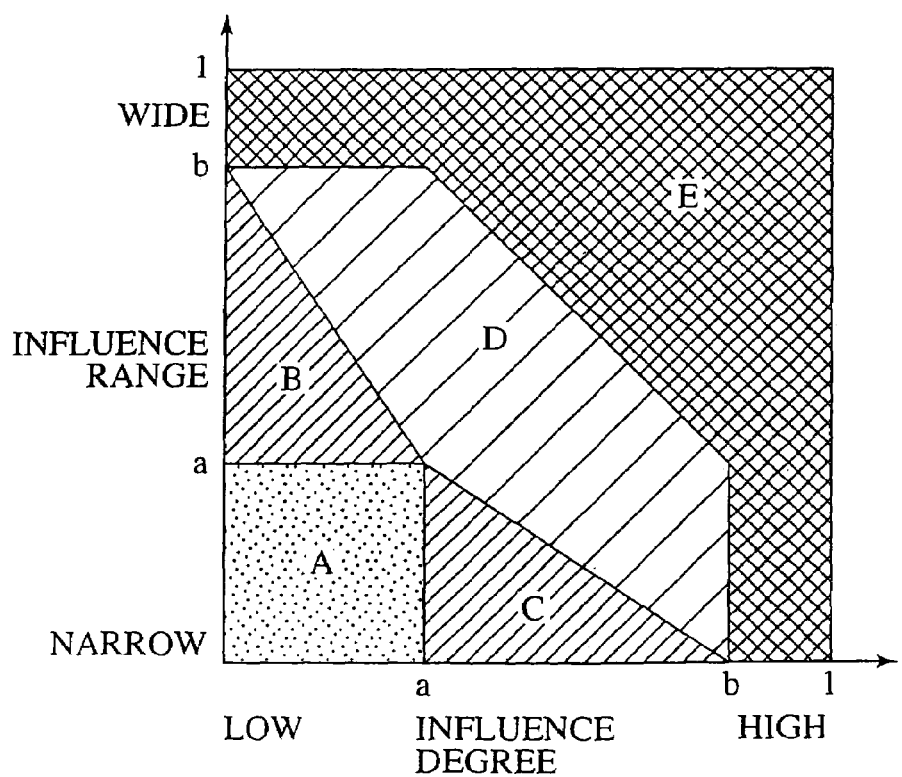
FIG. 17 is an example of displaying two-dimensional parameters of the influence degree and the influence range.

In a modification risk degree measurement system according to an embodiment of the present invention, a modification risk degree is calculated in consideration of both an "influence range" as a distribution status of influenced elements in the existing program and a "degree of influence" extended over the entire existing program by the influenced elements (refer to FIGS. 16 and 17). Here, the "risk degree" is a scale obtained by judging to what extent of a range and how much a specified modification plan gives an influence over all. For example, the case of modifying highly independent elements is conceived. Such elements are conceived to have a very low influence degree. However, supposing a case where these elements are extensively used in the program, the risk degree is accordingly elevated. On the contrary, the case of modifying lowly independent elements is conceived. Such elements are conceived to have relatively strong connections with other elements and to be large in terms of the degree of influence. However, if these elements are used only in a few regions of the program, then the risk degree thereof is not elevated very much.

When calculating the risk degree, it is desirable to quantify or normalize the influence range and the influence degree in advance. However, in the present invention, since only information in a source code is used for quantification for both thereof, it is apparent that values having determined upper limits are adopted. Therefore, appropriate normalization can be achieved by counting occurrence positions and an occurrence frequency to be quantized, or alternatively, by means of a preset calculation formula.

The "numerical value" is defined as a value subjected to quantization, and "quantization" is defined as counting the occurrence for each occurrence position. Moreover, "normalized value" is defined as a value subjected to normalization, and "normalization" is defined as accommodation of data in a certain range by a specified conversion. Note that, in the above-described specified conversion, there is an obtainment of a certain value by use of a calculation formula and the like. As one example, a vertical axis is set as the quantized or normalized influence degree, a horizontal axis is set as the quantized or normalized influence range, an origin is set as "min," and the value is set closer to "max" as it is spaced apart from the origin. For the parameter group, the risk degrees are allocated on several kinds of distribution maps in response to the source code and the modification plan. Furthermore, arbitrary weighting is performed for the influence range and the influence degree, and thus the risk degree calculation in response to the purpose of the modification plan can be performed, and the calculation result can be displayed.

Figure 13:
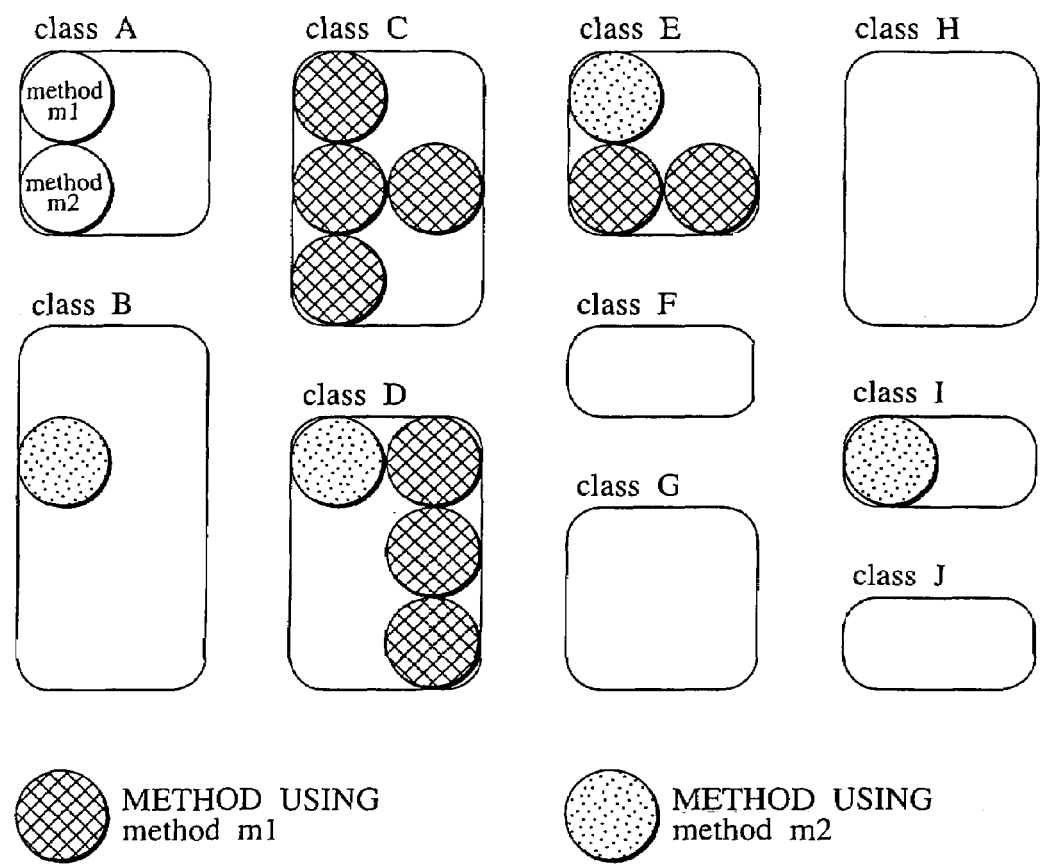
FIG. 13 shows model diagrams explaining differences between method units and class units in the influence range.

Here, description will be made for the "influence range" according to the embodiment of the present invention. With regard to the influence range, there is a possibility of causing a disparity between an expansion state when the entire program is seen at a method (function) unit and an expansion state when the entire program is seen at a class (module) unit. A concrete example is shown. In FIG. 13, seen at the method unit, a method m1 is used in nine methods, a method m2 is used in four methods, and therefore, it can be said that the influence range of the method m1 is wider. However, seen at the class unit, the method m1 is used in three classes, classes C, D and E, but the method m2 is used in four classes, classes B, D, E and I. Which taken to be the definition of the influence range is a matter not uniformly determined. For example, in the case of the object-oriented language, since the respective classes are expected to be designed with relatively high independence, it is more reasonable that the influence range is quantified by the number of classes rather than by simply counting the number of methods in many cases. However, in the case of the C language or the like, in some cases, the independency of the respective modules (classes) is not always high, and the quantification in terms of function units is desirable. Specifically, with regard to the "influence range," flexible unit modification is desirable according to the program modification plan and the programming language used.

The "influence degree" is obtained from a value counting external variables, arguments, class variables, return values or the like, which are present in the program (source code), or from a normal value obtained by normalizing the counting value. With regard to the influence given to other source codes by the external variables, the arguments, the class variables, the return values or the like, a primary influence directly giving an influence thereto, a secondary influence indirectly receiving an influence therefrom, and the like are conceived. Moreover, the influence degree needs a flexible modification in response to a kind of variables and the programming language for use.

Figure 14:
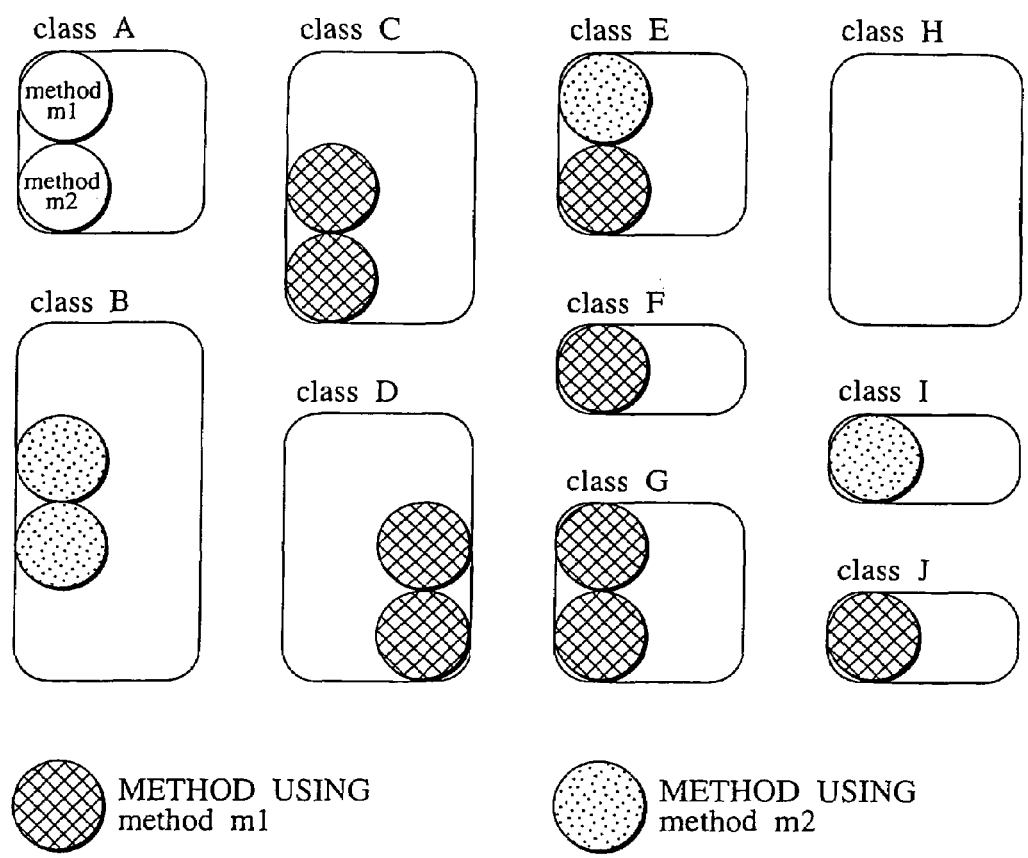
FIG. 14 shows model diagrams explaining combinations of the influence ranges and the influence degrees.

First, consideration will be made of a point of problem in a system of considering only the influence degree simply. In FIG. 14, it is assumed that influence degrees of two methods, the method m1 and the method m2, are the same. At this time, in the case of calculating risk degrees in consideration only of the influence degrees, since the influence degrees are the same, the risk degrees are calculated as being the same. However, in this case, if a modification according to the method m1 is performed, then there is a possibility that a secondary influence to the other nine elements in the program is derived. Meanwhile, with a modification according to the method m2, there is a possibility that a secondary influence to the other four elements is derived. In this case, obviously, it is not reasonable that the both modification risk degrees are regarded as the same.

Figure 15:
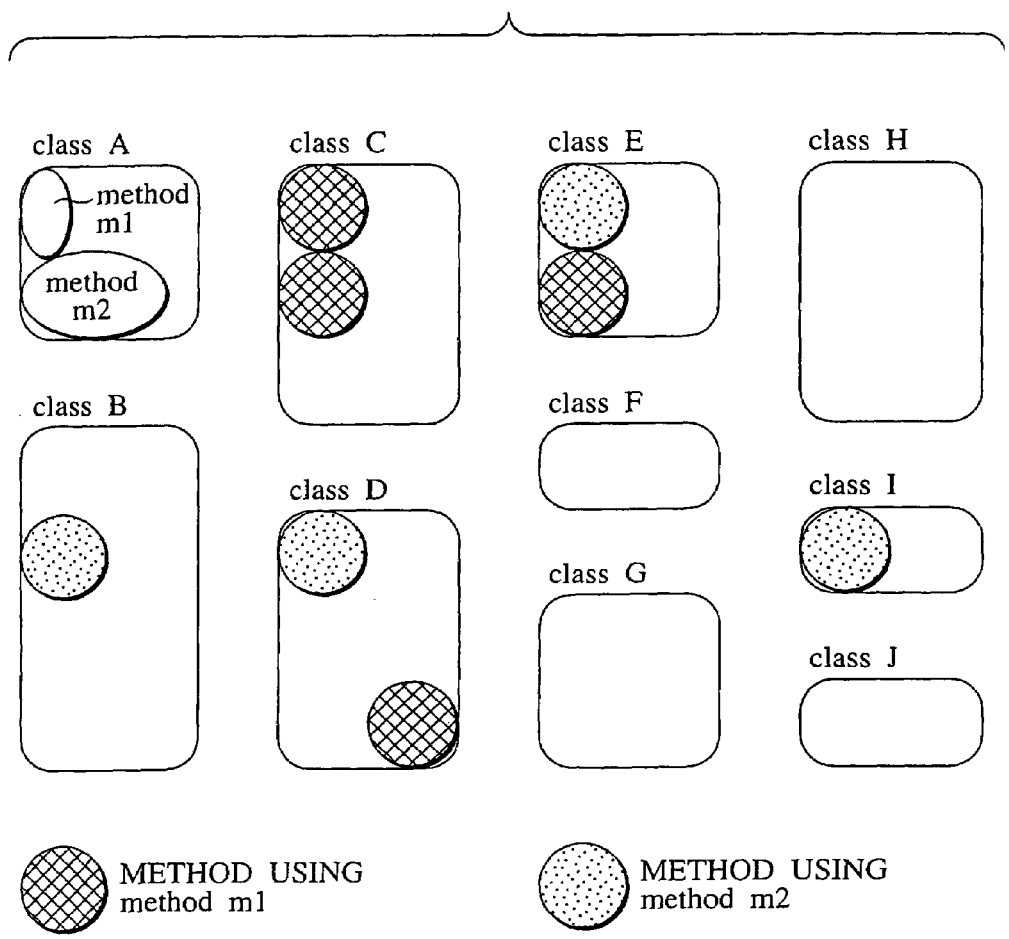
FIG. 15 shows model diagrams explaining combinations of the influence ranges and the influence degrees.

Next, consideration will be made of a point of problem in a system of considering only the influence range. As shown in FIG. 15, any of two methods, the method m1 and the method m2 has a possibility of deriving the secondary influence to the other four elements in the program. If only the influence range is considered, the risk degrees of the modifying task for these two methods are calculated to be the same. However, in this case, it is assumed that there is a difference between the influence degrees of the method m1 and the method m2. In the case where the external variables and number of parameters for use in the method m1 are more than those for use in the method m2, obviously, it is not reasonable that the risk degrees are regarded as the same without considering the difference between the two influence degrees.

In explanation of the embodiment of the present invention, a modification for a general object-oriented language such as Java and C++ is set as subject matter.

(Program Modification Risk Degree Measurement System)

As shown in FIG. 1, a program modification risk degree measurement system according to the embodiment of the present invention embraces a central processing unit (CPU) 20, a program storage unit 21, a data storage unit 22, an input unit 23 performing a control instruction and data input, an output unit 24 performing data output, a host computer 25, an interface 26, a system bus 27, and the like. Through the system bus 27, the CPU 20, a program storage unit 21, a data storage unit 22, an input unit 23, an output unit 24, a host computer 25, and an interface 26 are mutually connected, so as to communicate each other.

The CPU 20 executes the modification risk degree measurement program stored in the program storage unit 21, so as to realize the processing of the modification risk degree measurement system according to this embodiment. The CPU 20 incorporates modules such as extracting module 1, influence range specifying module 2, influence degree determining module 3, risk degree calculating module 4 and re-factoring module 5 therein. The extracting module 1 extracts a program constituent element in the existing program influenced by program modification data as an influenced element from the existing program and the program modification data. The influence range specifying module 2 specifies an influence range from the influenced element. The influence degree determining module 3 determines the degree of influence on the entire existing program of the influenced element. The risk degree calculating module 4 calculates the modification risk degree of the existing program from the program modification data using the influence degree and the influence range. The re-factoring module 5 performs assistance when the optimal program modification data is selected based on the calculated risk degree.

Each of these modules which stored in the program storage unit 21 is logical functional software, and each thereof can operate on a system physically different from others. The data storage unit 22 includes an influenced element storage unit 8, an influence range storage unit 9, an influence degree storage unit 10, a risk degree storage unit 11, a re-factoring storage unit 12, a source code storage unit 6 and a modification plan storage unit 7. The influenced element storage unit 8 stores an execution result of the influenced element extracting program and the like. The influence range storage unit 9 stores an execution result of the influence range specifying program and the like. The influence degree storage unit 10 stores an execution result of the influence degree determining program and the like. The risk degree storage unit 11 stores an execution result of the risk degree calculating program and the like. The re-factoring storage unit 12 stores an execution result of the re-factoring program and the like. Moreover, the source code storage unit 6 stores a source code inputted from the input unit 23, and the modification plan storage unit 7 stores a modification plan inputted from the input unit 23. The input unit 23 has a keyboard, a mouse and the like provided therein and receives data such as the source code and the modification plan. Note that, besides the above, the input unit 23 may receive data, the input may be performed from the host computer 25 through the interface 26 and a storage device such as a floppy disk. The output unit 24 has a display unit, a printer and the like provided therein and outputs data. Note that, besides the above, the output unit 24 may store an output result in a file or a storage device such as a floppy disk, or may output the data to the host computer 25 through the interface 26.

Figure 2:
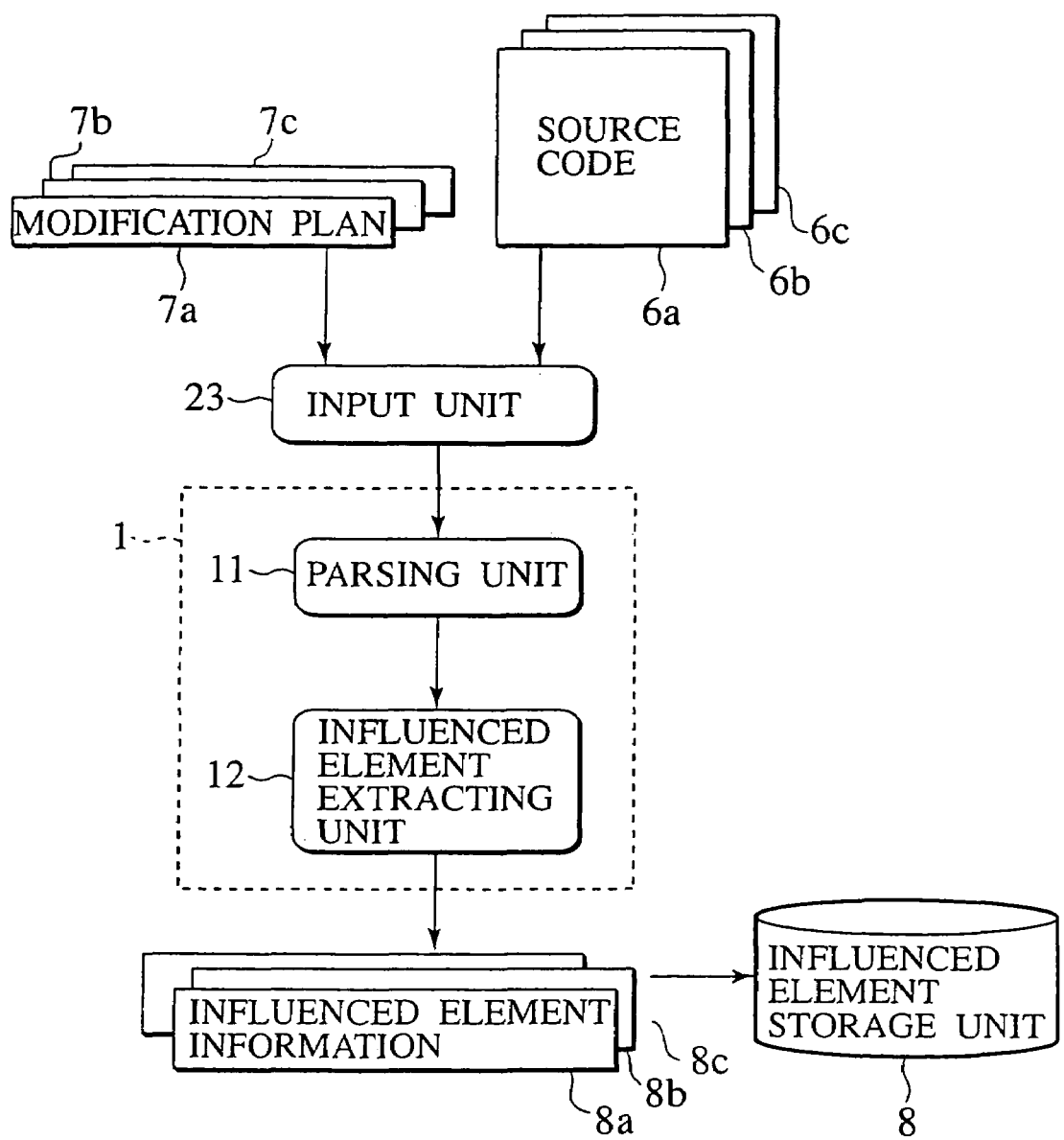
FIG. 2 is a block diagram schematically showing extracting module according to the embodiment of the present invention.

As shown in FIG. 2, the extracting module 1 according to the embodiment of the present invention has a parsing unit 11 and an influenced element extracting unit 12. The parsing unit 11 reads modification plans 7a,7b,7c, . . . and source codes 6a,6b,6c, . . . through the input unit 23, performs parsing, and prepares information conceived to be necessary in specifying the influence ranges of a syntactic structure, variable definition and the like. Note that, though not shown, the inputted modification plans 7a, 7b, 7c, are transmitted to the modification plan storage unit 7 to be stored therein, and the source codes 6a, 6b, 6c . . . are transmitted to the source code storage unit 6 to be stored therein. The influenced element extracting unit 12 extract source code regions (influenced element information 8a,8b,8c, . . . ) having a possibility of being modified, which results from execution of the modification plans 7a,7b,7c, . . . by use of the modification plans 7a,7b,7c, . . . and the source codes 6a,6b,6c, . . . analyzed in the parsing unit 11. As an example of the modification plan, finite difference information for use in a patch command of the UNIX is given. Note that the extracted influenced element information 8a, 8b, 8c, is stored in the influenced element storage unit 8 for each element.

Figure 3:
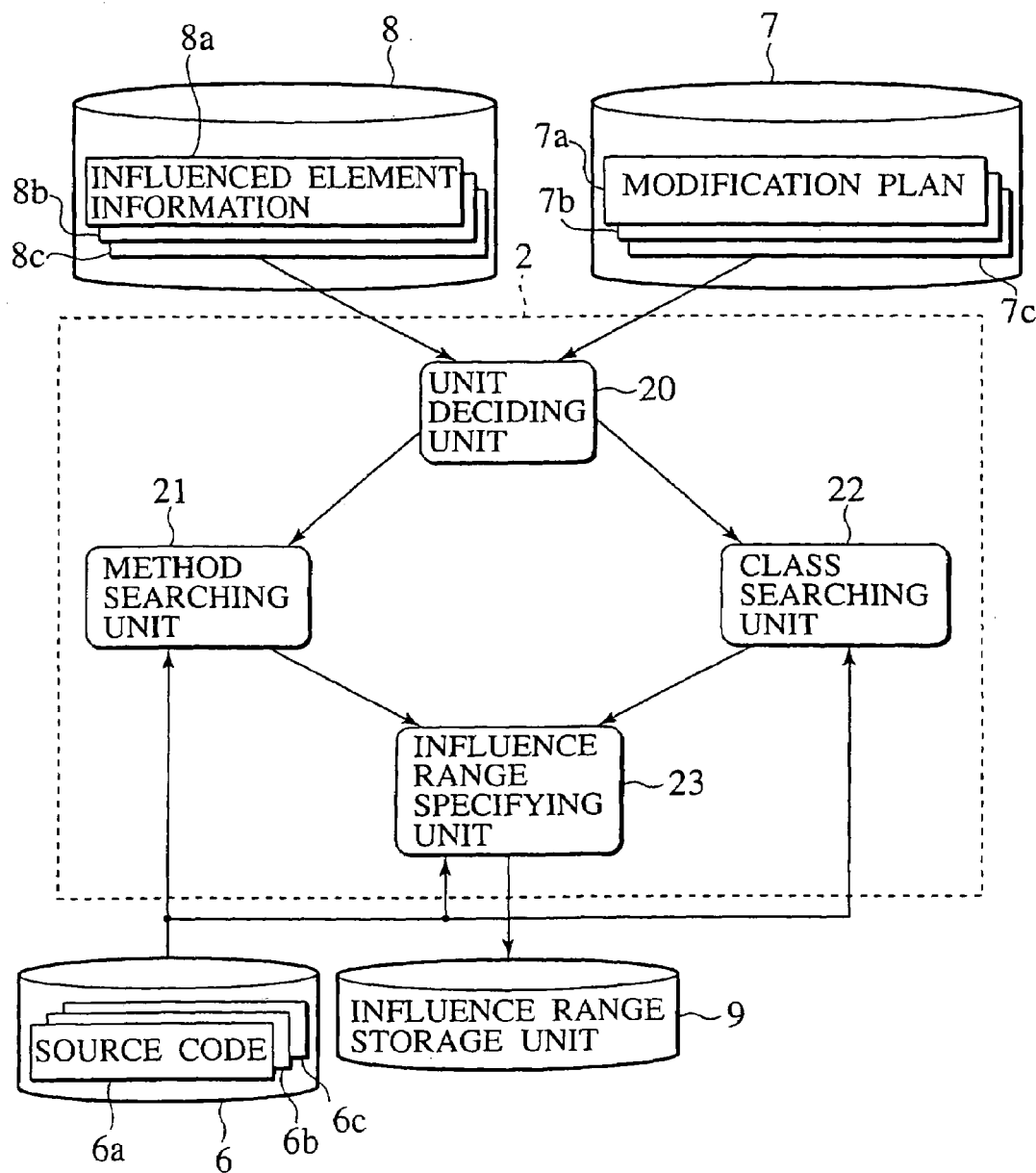
FIG. 3 is a block diagram schematically showing an influence range specifying module according to the embodiment of the present invention.

As shown in FIG. 3, the influence range specifying module 2 according to the embodiment of the present invention has a unit deciding unit 20, a method searching unit 21, a class searching unit 22 and an influence range specifying unit 23. The method deciding unit 20 takes out one of modification plans 7a, 7b, 7c, . . . stored in the storage unit 7 and one of the influenced element information 8a, 8b, 8c, . . . stored in the influenced element storage unit 8, and decides units of the influence range by an instruction of an operator or a stored program in response to the purpose of the modification plans 7a, 7b, 7c, . . . . In this embodiment, two units, the method unit and the class unit, are used. When the method unit is selected in the unit deciding unit 20, the influenced element information 8a, 8b, 8c . . . is transmitted to the method searching unit 21. When the class unit is selected, the influenced element information 8a, 8b, 8c . . . are transmitted to the class searching unit 22.

In the method searching unit 21, a method serving as the influenced element information 8a, 8b, 8c . . . are searched by use of slicing technique and the like. The searched influenced element information 8a, 8b, 8c . . . are transmitted to the influence range specifying unit 23 per method unit. In the class searching unit 22, a class serving as the influenced element information 8a, 8b, 8c . . . are searched by use of an interclass dependency relationship graph and the like. The searched influenced element information 8a, 8b, 8c . . . are transmitted to the influence range specifying unit 23 per class unit. The influence range determining unit 23 determines a distribution status of the influenced element information 8a,8b,8c, . . . , for example, in the source codes 6a,6b,6c, . . . per unit. Specifically, an occurrence position and an occurrence count and the like of the influenced element information 8a, 8b, and 8c . . . are extracted. Note that the extraction of the occurrence position and the occurrence count of the influenced element information 8a, 8b, 8c . . . are realized by performing merge processing of the influenced element information 8a, 8b, 8c . . . and the source codes 6a, 6b, 6c . . . and the like. Moreover, since the influence range is used later when the risk degree is calculated, the influence range is quantized or normalized. Information such as the occurrence position, the occurrence count and the normalized numerical value and the like of the influenced element information 8a, 8b, 8c . . . which are obtained by the influence range specifying unit 23, are stored in the influence range storage unit 9. Note that, for units of the influence range, ones such as the method unit, the class unit, the block unit, the variable unit are conceived, and any unit is set usable.

Figure 4:
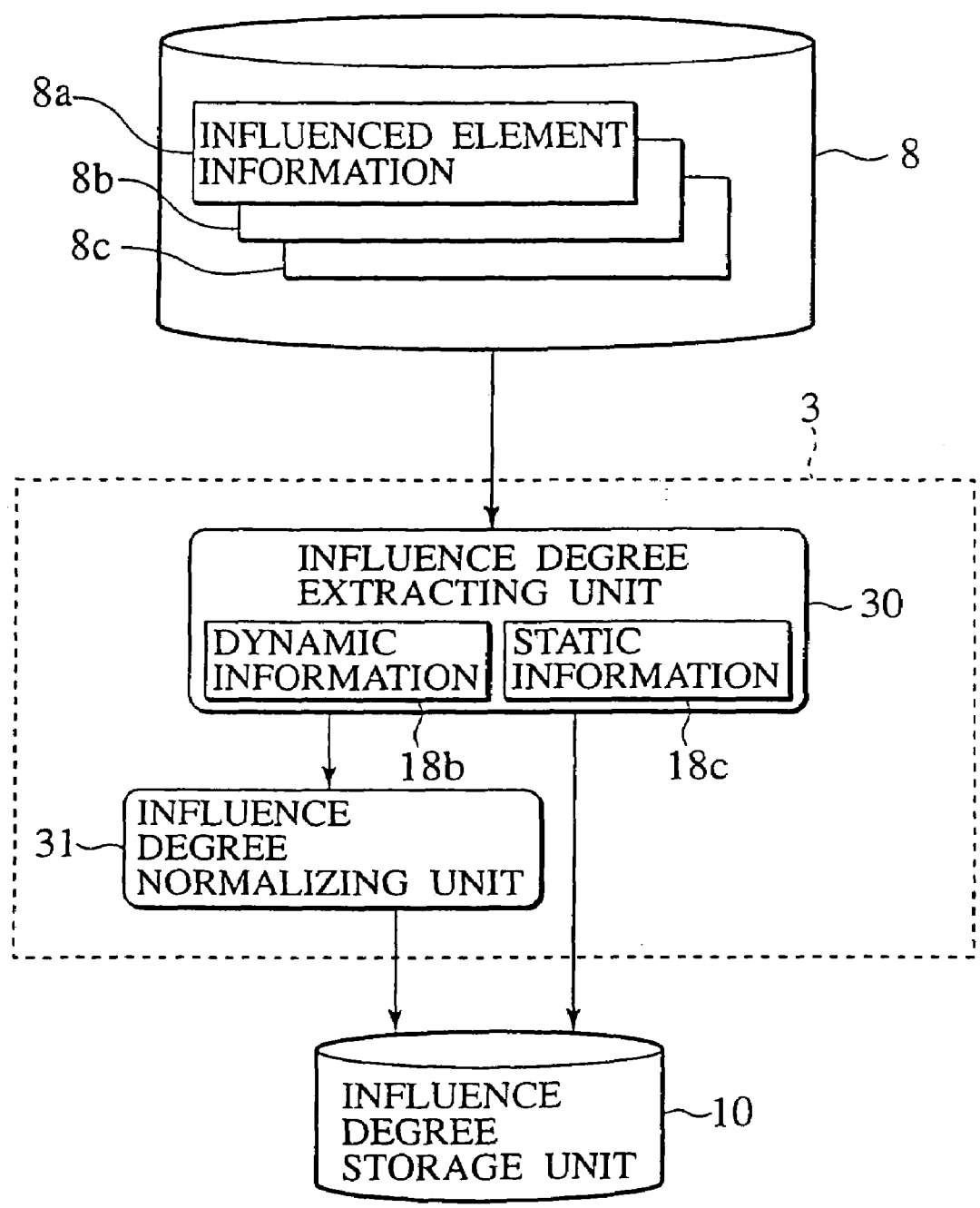
FIG. 4 is a block diagram schematically showing the influence range specifying module according to the embodiment of the present invention.

As shown in FIG. 4, the influence degree determining module 3 according to the embodiment of the present invention has an influence degree extracting unit 30 and an influence degree normalizing unit 31. The influence degree determining module 3 takes out one of the influenced element information 8a,8b,8c, . . . stored in the influenced element storage unit 8, and extracts an influence degree contained in the influenced element information 8a,8b,8c . . . serving as a base of the influence degree. In the influence degree, two kinds of information, dynamic information 18b and static information 18c, are present. The dynamic information 18b indicates the number counted as the influenced element information 8a, 8b, 8c . . . by the extracting module 1, the execution count based on an operation profile, and the like. The static information 18c indicates a reference frequency of the influenced element information 8a, 8b, 8c . . . in the program, a mutual dependency relationship between the influenced element information 8a, 8b, 8c . . . and the other elements, and the like. Between the extracted influence degrees, the dynamic information 18b is transmitted to the influence degree normalizing unit 31, and the static information 18c is transmitted to the influence degree storage unit 10 to be stored therein. In the influence degree normalizing unit 31, the dynamic information is quantized or normalized. Information such as external variables, an argument, a class variable and a return value, which are quantized or normalized as the dynamic information 18b, is quantized by counting the occurrence count and the like or normalized by use of a calculation formula and the like. Note that the information such as a numerical value obtained by the influence degree normalizing unit 31 is stored as the dynamic information 18b in the influence degree storage unit 10. The information stored in the influence degree storage unit 10 is accumulated and utilized from now on as secondary information from the outside, which is utilized when the value of the influence degree is adjusted, for example, when the calculation formula for the influence degree is created.

Figure 5:
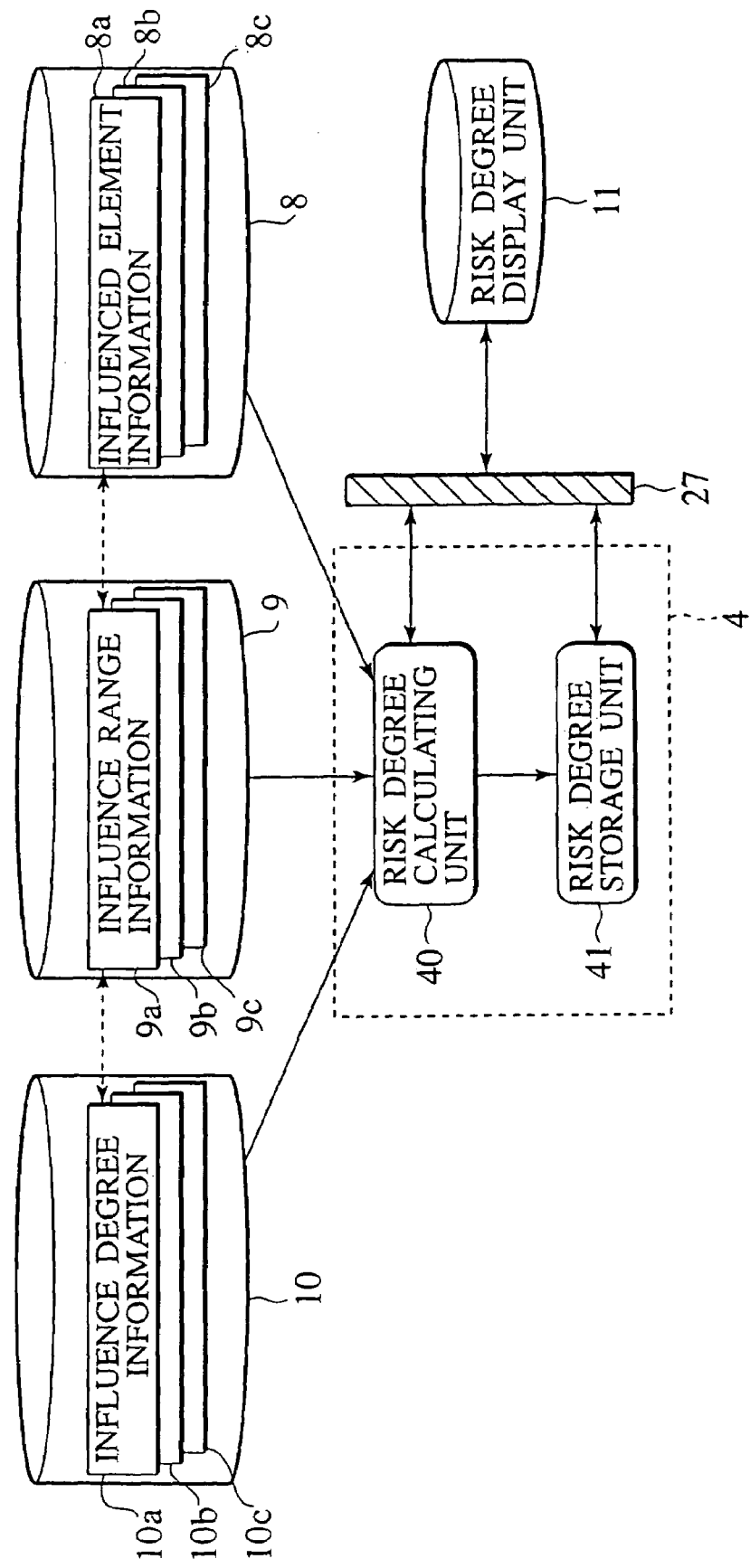
FIG. 5 is a block diagram schematically showing a risk degree calculating module according to the embodiment of the present invention.

As shown in FIG. 5, the risk degree calculating module 4 according to the embodiment of the present invention has a risk degree calculating unit 40 and a risk degree display unit 41. The risk degree calculating unit 40 takes out influence range information 9a,9b,9c, . . . stored in the influence range storage unit 9 and the influenced element information 8a,8b, 8c, . . . composing a pair with this influence range information 9a,9b,9c, . . . one by one, takes influence degree information 10a,10b,10c, . . . corresponding to the influence range information 9a,9b,9c, . . . out of the influence degree storage unit 10, and calculates the risk degree for each influenced element information 8a,8b,8c, . . . by adding the extracted influence range information 9a,9b,9c, . . . , influenced element information 8a,8b,8c, . . . and influence range information 9a,9b,9c, . . . . Note that, besides the influence range and the influence degree, arbitrary weighting (numerical value assignment) is performed for the calculation formula, and thus it is possible to perform the risk degree calculation in response accordance with various purposes. Note that the information such as the numerical value obtained by the risk degree calculating unit 40 is stored in the risk degree storage unit 11.

The risk degree display unit 41 edits information such as the numerical value obtained by the risk degree calculating unit 40, and prepares to browse the risk degree information by use of the input unit and the like shown in FIG. 1. Concretely, the influence degree is inputted as a first parameter, the influence range is inputted as a second parameter, a parameter group expressed two-dimensionally by the first parameter and the second parameter is constituted, and the risk degree is displayed two-dimensionally (refer to FIG. 16 and FIG. 17). As a display method, not only a simple linear combination but also a combination reflecting various policies can be conceived.

Figure 6:
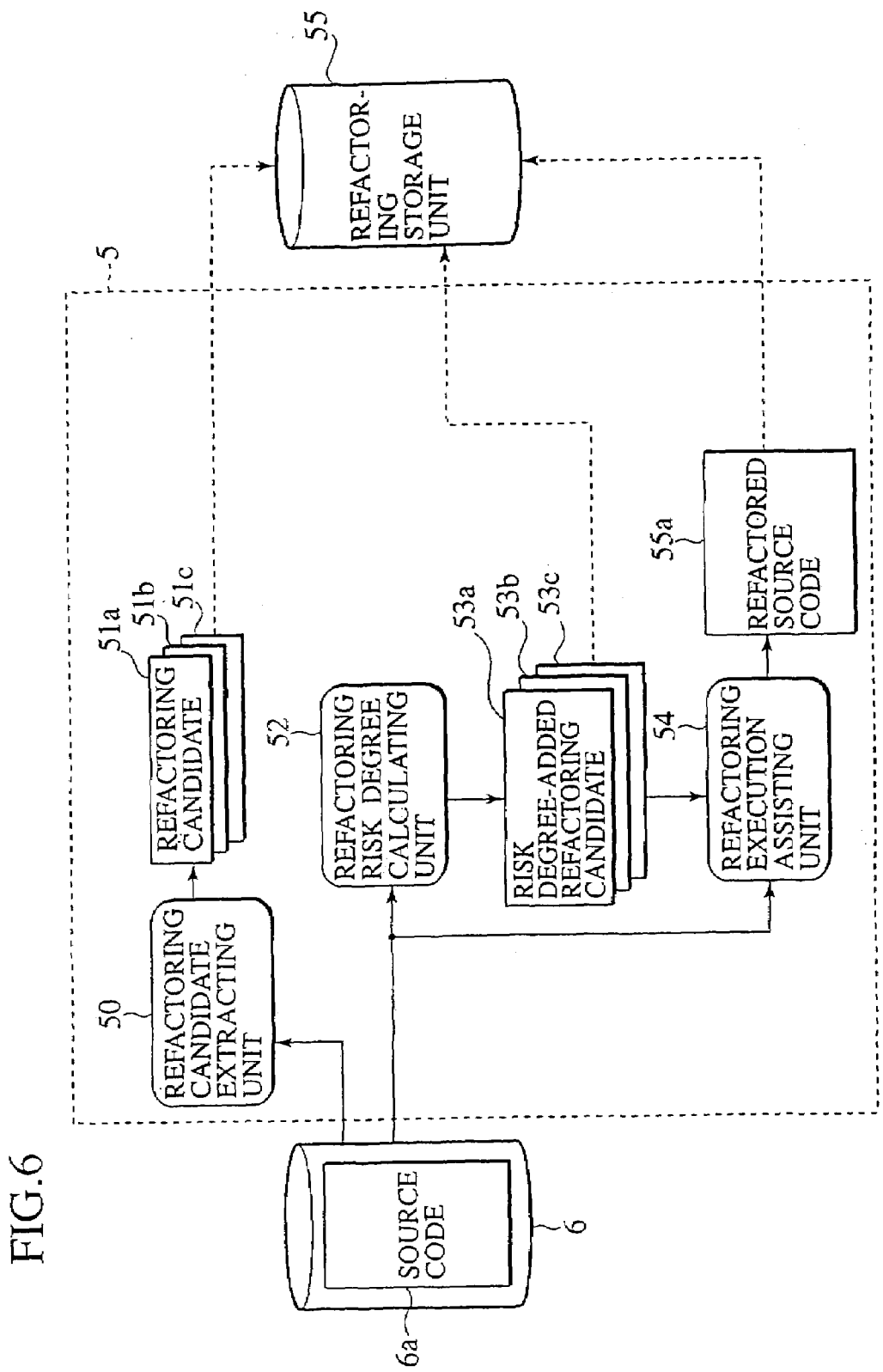
FIG. 6 is a block diagram schematically showing a re-factoring module according to the embodiment of the present invention.

As shown in FIG. 6, the re-factoring module 5 according to the embodiment of the present invention is constituted of a re-factoring candidate extracting unit 50, a re-factoring risk degree calculating unit 52 and a re-factoring execution assisting unit 54. The re-factoring candidate extracting unit 50 takes out and parses the source codes 6a,6b,6c, . . . inputted to the source code storage unit 6, explores a candidate plan for re-factoring, and extracts re-factoring candidates 51a,51b,51c, . . . . The extracted re-factoring candidates 51a, 51b, 51c, . . . are transmitted to the re-factoring risk degree calculating unit 52, and temporarily stored in a re-factoring storage unit 55.

The re-factoring risk degree calculating unit 52 calculates the re-factoring risk degree based on the extracted re-factoring candidates 51a, 51b, 51c, . . . and the source codes 6a,6b,6c, . . . . The re-factoring candidates 51a, 51b, 51c, . . . are added to the calculated risk degree, transmitted as risk degree-added re-factoring candidates 53a,53b,53c, . . . to the re-factoring execution assisting unit 54, and stored in the re-factoring storage unit 55. The re-factoring execution assisting unit 54 submits information to be useful for actually re-factoring the original source codes 6a, 6b, 6c . . . by use of the risk degree-added re-factoring candidates 53a, 53b, 53c . . . and performs assistance for the re-factoring. Note that the re-factoring candidates 51a, 51b, 51c, . . . , the risk degree-added re-factoring candidates 53a,53b,53c, . . . and the re-factored source code 55a are stored in the re-factoring storage unit 55.

(Modification Risk Degree Measurement Method)

Next, an explanation will be made of the measurement method using the modification risk degree measurement system according to the embodiment of the present invention. With reference to the flowchart shown in FIG. 7, explanation will be made for an operation where the operator inputs the source codes 6a, 6b, 6c . . . and the modification plans 7a, 7b, 7c . . . outputs the risk degree, and performs re-factoring based on the risk degree.

Figure 7:
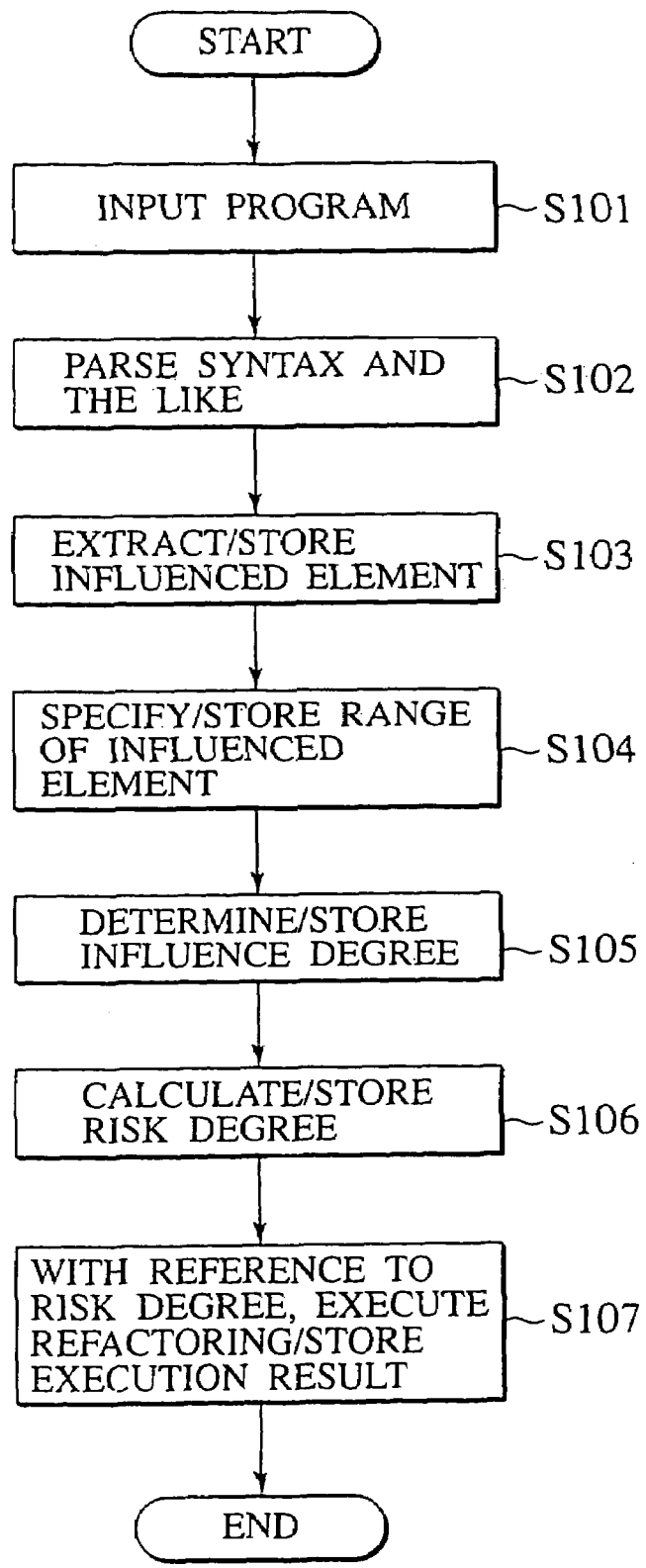
FIG. 7 is a flowchart showing the entire flow of a modification risk degree measurement method according to the embodiment of the present invention.

(a) In step S101, first, as shown in FIG. 7, the operator inputs the source codes 6a, 6b, 6c . . . and the modification plans 7a, 7b, 7c . . . . First, objective source codes 6a, 6b, 6c . . . are read out of the input unit 23, and stored in the source code storage unit 6. Next, the modification plans 7a, 7b, 7c . . . are read out of the input unit 23, and stored in the modification plan storage unit 7.

(b) In step S102, the source codes 6a, 6b, 6c, . . . and the modification plans 7a, 7b, 7c, . . . , which are stored in step S101, are read out of the source code storage unit 6 and the modification plan storage unit 7 again, these are parsed, information such as the syntactic structure and the variable definition is prepared, and preparation of extraction processing is performed.

(c) In step S103, the extraction processing of the influenced element information 8a, 8b, 8c . . . are performed by use of the extracting module 1. From the modification plans 7a, 7b, 7c . . . the modification elements are taken out one by one, and elements (influenced element information 8a, 8b, 8c . . . ) that can be possibly influenced by these elements are extracted from the source codes 6a, 6b, 6c . . . . The extracted influenced element information 8a, 8b, 8c . . . are transmitted to the influenced element storage unit 8 to be stored therein.

(d) In step S104, by use of the influence range specifying module 2, the influence range specifying processing of the influenced element information 8a, 8b, 8c . . . are performed. The influenced element information 8a, 8b, 8c, . . . stored in the influenced element storage unit 8 are taken out one by one, the range unit is decided in response to the purpose of the modification plans 7a, 7b, 7c, . . . , the distribution position of the influenced element information 8a, 8b, 8c, . . . in the source codes 6a, 6b, 6c, . . . and the like are determined for each range unit. The determined influence range is transmitted to the influence range storage unit 9 to be stored therein.

(e) In step S105, by use of the influence degree determining module 3, the influence degree determining processing of the influenced element information 8a, 8b, 8c . . . are performed. Out of the modification plans 7a, 7b, 7c . . . the modification elements are taken out one by one, and the influenced element information 8a, 8b, 8c . . . corresponding to the modification elements are extracted from the source codes 6a, 6b, 6c . . . . The extracted influence degree is transmitted to the influence degree storage unit 10 to be stored therein.

(f) In step S106, by use of the risk degree calculating module 4, the calculation processing of the risk degree is performed. The value obtained by quantizing or normalizing the influence degree and the value obtained by quantizing or normalizing the influence range are taken out, and the risk degree is calculated by use of the calculation formula and outputted on a screen of a general-purpose machine or the like. Information of the calculated risk degree is transmitted to the risk degree storage unit 11 to be stored therein.

(g) In step S107, by use of the re-factoring module 5, re-factoring processing is performed based on the information of the modification risk degree obtained in steps S101 to S106. The source codes 6a, 6b, 6c . . . are taken out of the source code storage unit 6, and the re-factoring candidates 51a, 51b, 51c, . . . are extracted. Furthermore, the risk degree is calculated based on the extracted re-factoring candidates 51a, 51b, 51c, . . . , and the re-factoring assistance is executed based on the calculated risk degree-added re-factoring candidates 53a, 53b, 53c, . . . . The source code having been subjected to the re-factoring assistance is transmitted to the re-factoring storage unit 55 to be stored therein.

In step S102 shown in FIG. 7, the source codes 6a, 6b, 6c, . . . and the modification plans 7a, 7b, 7c, . . . , which are stored in step S101, are parsed, each information such as the syntactic structure and the variable definition is prepared, and preparation of the extraction processing is performed. For an algorithm for parsing the syntax and the like, a publicly known technique for use in a compiler and the like is used. This is composed of a code table (variable definition information) and a syntax tree (syntactic structure information). As information registered therein, there are pieces of information such as a variable name, a defined row number, a variable type, an initial value of the variable, a pointer to a high-order (parent) variable information, a pointer to a low-order head (firstborn) variable information, a pointer to a variable (younger brother) having the same parent and defined next, a pointer to information of a variable redefined by the variable, a pointer to a list of the information of the variables redefined by the variable, a list of pointers to regions where the variables are set on the syntax tree, a list of pointers to regions where the variables are referred to on the syntax tree, information of variables in an inclusion relationship with the variables, and the like.

The syntax tree expresses the syntactic structure of the program by representing a connection of statements obtained in response to the execution order of the program. Each node of the syntax structure corresponds to a command statement or formula of the program and contains information. The entire information constitutes the program. In information owned by the syntax structure, in the case of an assignment statement, as statement class (=assignment) information, there are a row number, a pointer to a basic block, a pointer to a formula of an assignment source, a pointer to a column of a name table corresponding to a variable of an assignment destination, a pointer to the next statement and the like. In the case of a conditional branch statement, as statement class (=conditional branch) information, there are a row number, a pointer to the basic block, a pointer to conditional formula information, a pointer to a statement head of a then portion, a pointer to a statement head of an else portion, a pointer to the next statement, and the like. Moreover, as information of the conditional formula, there are a class of an operator, a pointer to information of a right-hand side formula, a pointer to information of a left-hand side formula, and the like.

Figure 8:
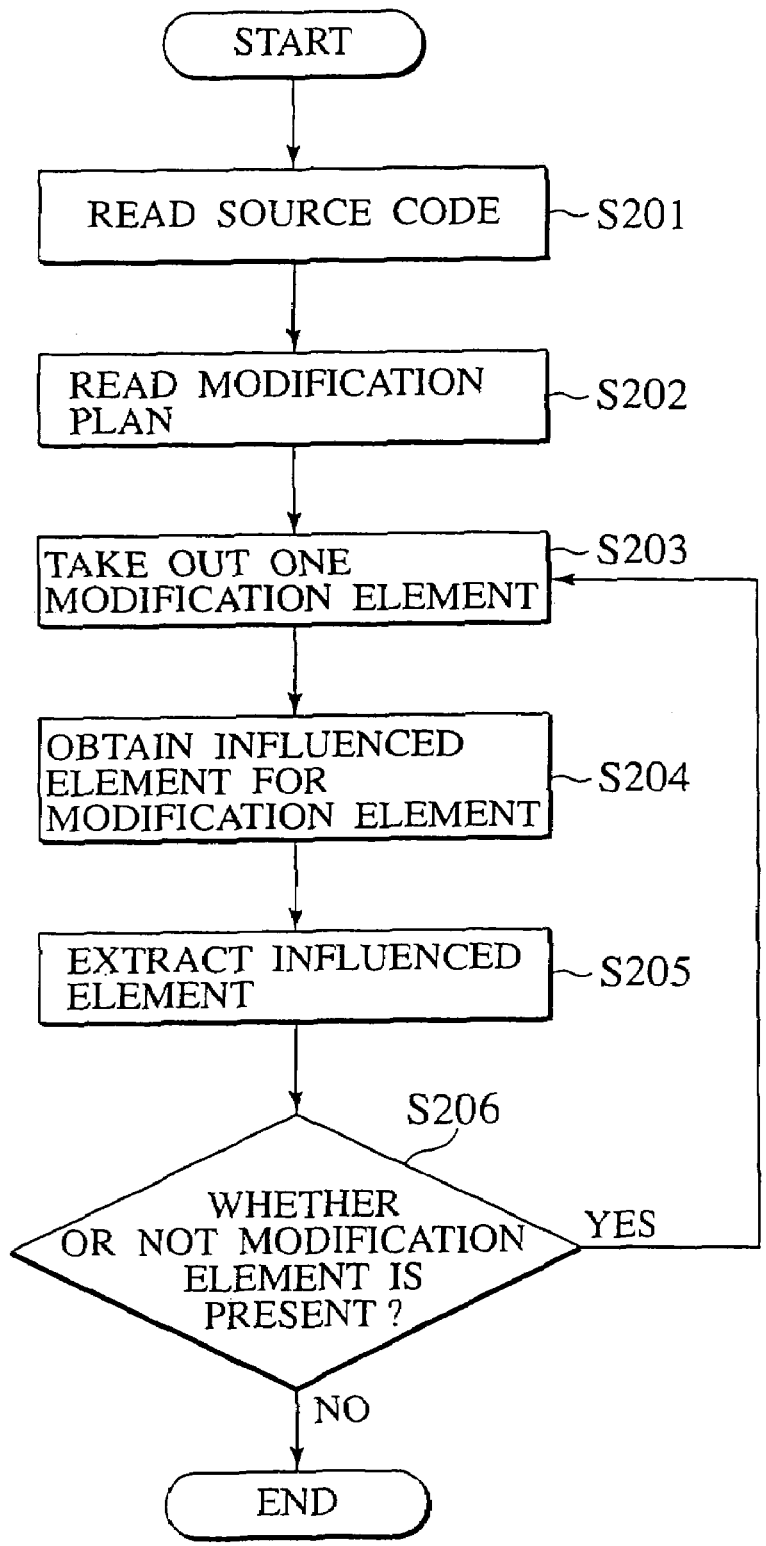
FIG. 8 is a flowchart showing an operation flow of steps for extracting an influenced element according to the embodiment of the present invention.

Next, explanation will be made for an operation flow of step S103 (extraction processing of the influenced element information 8a, 8b, 8c . . . ) in FIG. 7 with reference to FIG. 8.

(a) First, in step S201, the source codes 6a, 6b, 6c, . . . to be extracted are read, and next, in step S202, the modification plans 7a, 7b, 7c, . . . having the purpose of modifying the source codes 6a, 6b, 6c, . . . are read. At this time, for one of the source codes 6a, 6b, 6c . . . the modification plans 7a, 7b, 7c . . . may be present in plural.

(b) Next, in step S203, one modification element is taken out of the modification plans 7a, 7b, 7c, . . . read in step S202, a region (influenced element information 8a, 8b, 8c, . . . ) that can be possibly influenced by the modification element is searched from the source codes 6a, 6b, 6c, . . . , and the number of influenced element information 8a, 8b, 8c, . . . are counted and quantized. Note that a set of the influenced element information 8a, 8b, 8c . . . influenced by a specified modification c is defined as:

$$\epsilon(c) \qquad (1)$$

Note that the normalization will be explained in a modification example.

(c) Next, in step S205, the searched influenced element information 8a, 8b, 8c . . . are extracted one by one and stored in the influenced element storage unit 8. Finally, in step S206, a determination is made as to whether or not the modification element currently processed is the last modification element, and if the modification element is not the last modification element, then the process returns to step S203, and the above-described operations are repeated. If the modification element is the last modification element, this extraction processing is terminated.

Figure 9:
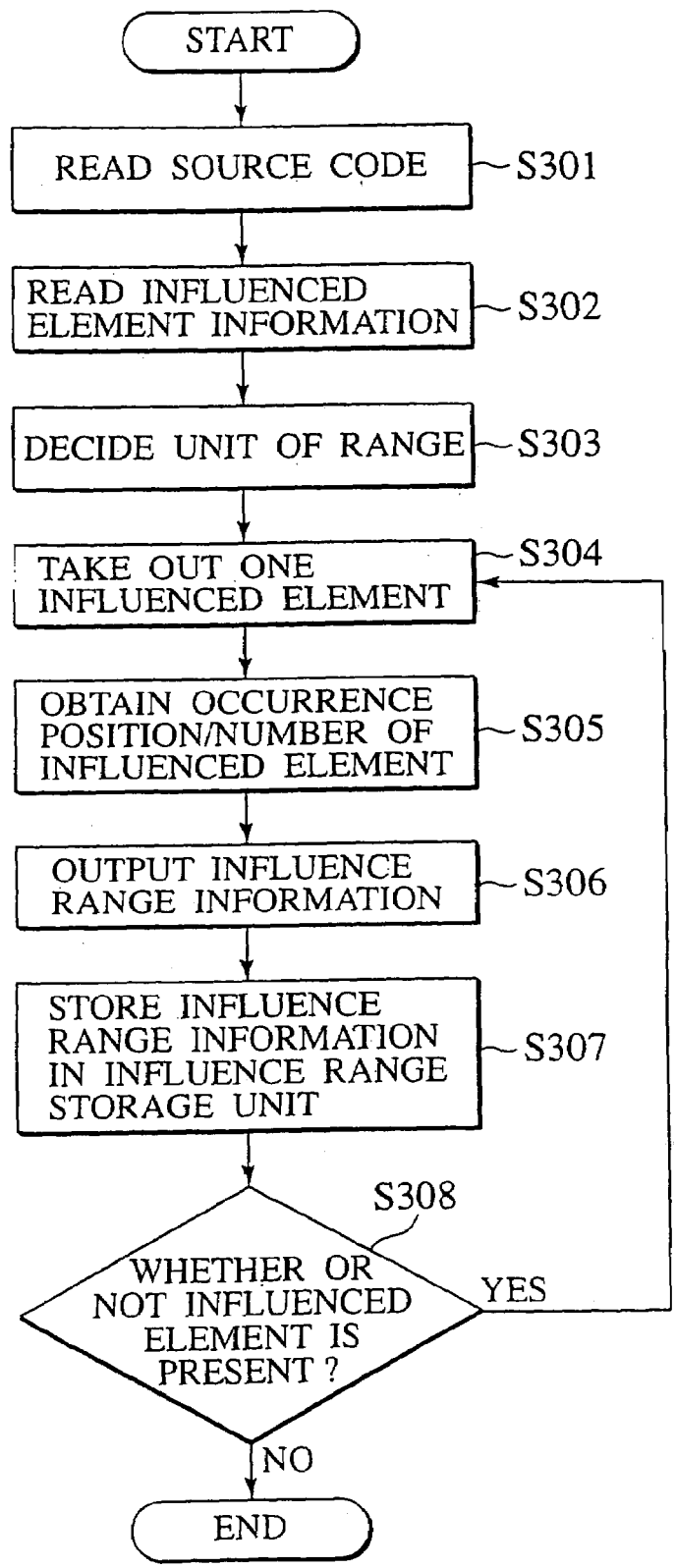
FIG. 9 is a flowchart showing an operation flow of steps for specifying an influence range according to the embodiment of the present invention.

Next, with reference to FIG. 9, explanation will be made for an operation flow of step S104 (specifying processing of the influence range) of FIG. 7.

(a) First, in step S301, the source codes 6a,6b,6c, . . . to be extracted are read, and in step S302, the influenced element information 8 prepared in step S103 is read.

(b) Next, in step S303, a unit of the influence range itself is decided. This is one, with regard to one influenced element information 8a,8b,8c, . . . taken out in step S303, modifying a unit of partitioning the source codes 6a,6b, 6c, . . . in response to the purpose of the modification plans 7a,7b,7c, . . . , the programming language for use or the like, which are executed by the operator or the stored program. In this embodiment, the source codes 6a, 6b, 6c . . . are partitioned by the method unit and the class unit. Decided as the method unit, the source codes 6a, 6b, 6c . . . are partitioned by the method unit, and decided as the class unit, the source codes 6a, 6b, 6c . . . are partitioned by the class unit.

(c) Next, in step S304, one influenced element information 8a, 8b, 8c . . . are taken out of the influenced element information 8. Next, in step S305, the occurrence position and the occurrence count of the influenced element information 8a, 8b, 8c . . . in the source codes 6a, 6b, 6c . . . are obtained.

(d) In step S306, the influenced range is specified based on the occurrence position and the occurrence count, and moreover, the influenced range is quantized or normalized. As the influence range, the influence range of a specified modification c is expressed as the number of methods where the elements of the set ϵ(c) of the influenced element information 8a,8b,8c, . . . are present, the occurrence count of the methods is counted and quantized for each occurrence position (method and class), which is defined as:

$$\rho(c) \tag{2}$$

Note that the normalization will be explained in a modification example.

(e) Note that the specified influenced range and the quantized or normalized influenced range are stored in the influence range storage unit in step S307.

(f) Finally, in step S308, a determination is made as to whether or not the influenced element information 8a, 8b, 8c, . . . currently processed is the last influenced element information 8a, 8b, 8c, . . . , and if the influenced element information 8a, 8b, 8c, . . . are not the last influenced element information 8a, 8b, 8c, . . . , then the process returns to step S304, and the above-described operations are repeated. If the influenced element information 8a, 8b, 8c . . . are the last influenced element information 8a,8b, 8c, . . . , then this specifying processing is terminated.

Figure 10:
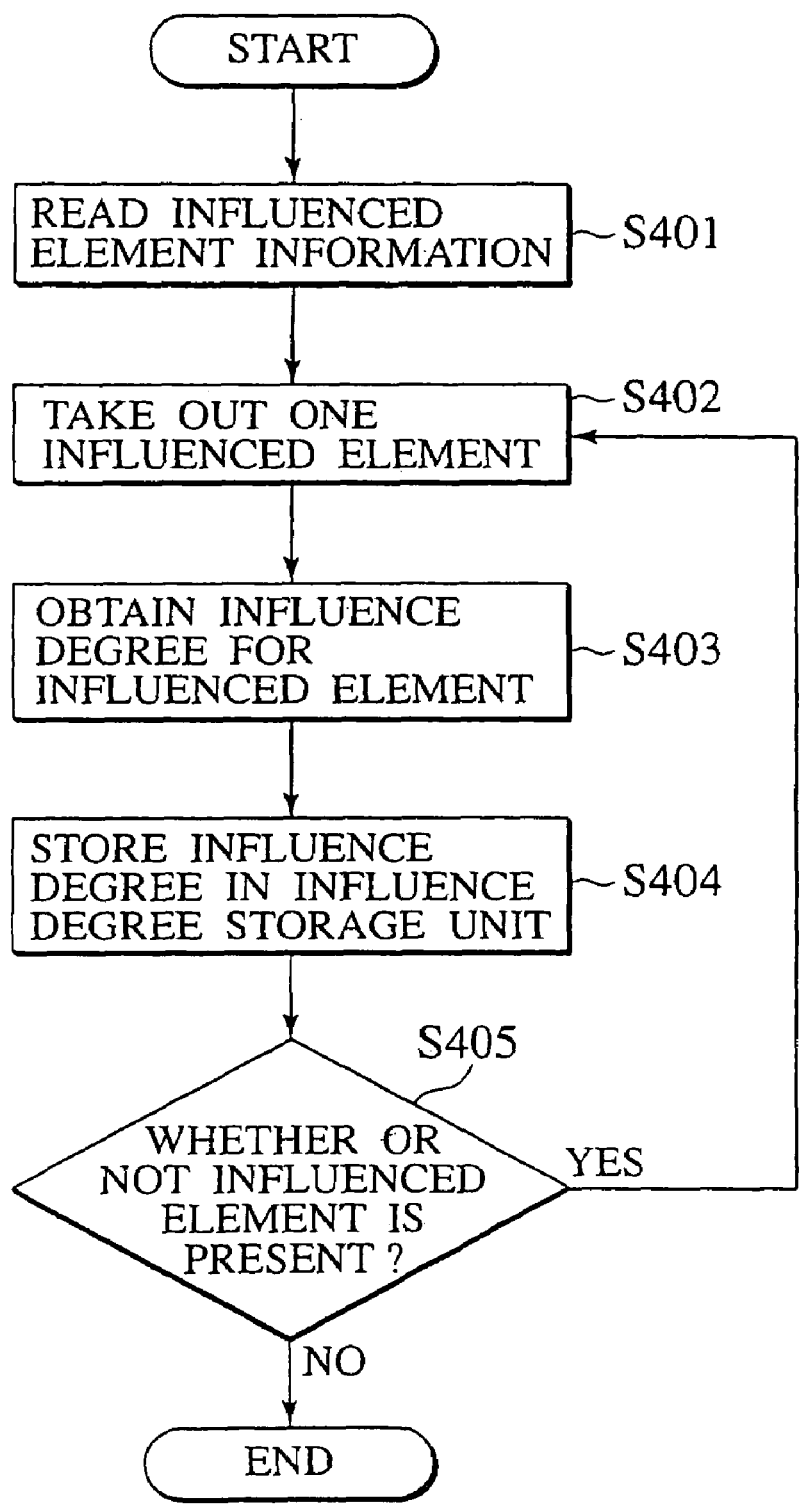
FIG. 10 is a flowchart showing an operation flow of steps for judging an influence degree according to the embodiment of the present invention.

Next, with reference to FIG. 10, explanation will be made for an operation flow of step S105 (determining processing of the influence degree) of FIG. 7.

(a) First, in step S401, the information of the influenced element information 8a,8b,8c, . . . prepared in step S103 is read, and in step S402, one influenced element information 8a,8b,8c, . . . are taken out of the information of the influenced element information 8a,8b,8c, . . . .

(b) Next, in step S403, the influence degree of the influenced element information 8a, 8b, 8c . . . are determined. In the influence degree, there are two kinds of information, dynamic information and static information. As the dynamic information, there are the number counted as the influenced element information 8a,8b,8c, . . . by the extracting module of the influenced element information 8a,8b,8c, . . . and the execution count based on the operation profile, which concretely indicate the external variable, the argument, the class variable, the return value and the like. As the static information, there are a reference frequency of the influenced element information 8a, 8b, 8c . . . in the program, a mutual dependency relationship between the influenced element information 8a, 8b, 8c . . . and the other elements, and the like. In this embodiment, between the influence degrees, the dynamic information regarded as important is quantized or normalized, and the static information is transmitted to the influence degree storage unit 10 to be stored therein.

Here, the influence degree of the dynamic information is quantized or normalized. The influence degree of specific modification to the specific element m (a method and class) is set as a total number of the external variables, the arguments, the class variables and the return values, which are used in a specified element (method and class), and the external variables, the arguments, the class variables and the return values are counted for each occurrence thereof in the method and the class, which are defined:

$$\Delta(m) \tag{3}$$

Note that explanation will be made for the normalization in the modification example.

(c) In step S404, the determined influence degree and the quantized or normalized influence degree are stored in the influence degree storage unit 10. Finally, in step S405, determination is made as to whether or not the influenced element currently processed is the last influenced element information 8a,8b,8c, . . . , and if the influenced element information 8a,8b,8c, . . . are not the last influenced element information 8a,8b,8c, . . . , the process returns to step S402, and the above-described operations are repeated. If the influenced element information 8a, 8b, 8c . . . are the last influenced element information 8a, 8b, 8c . . . this determining processing is terminated.

Figure 11:
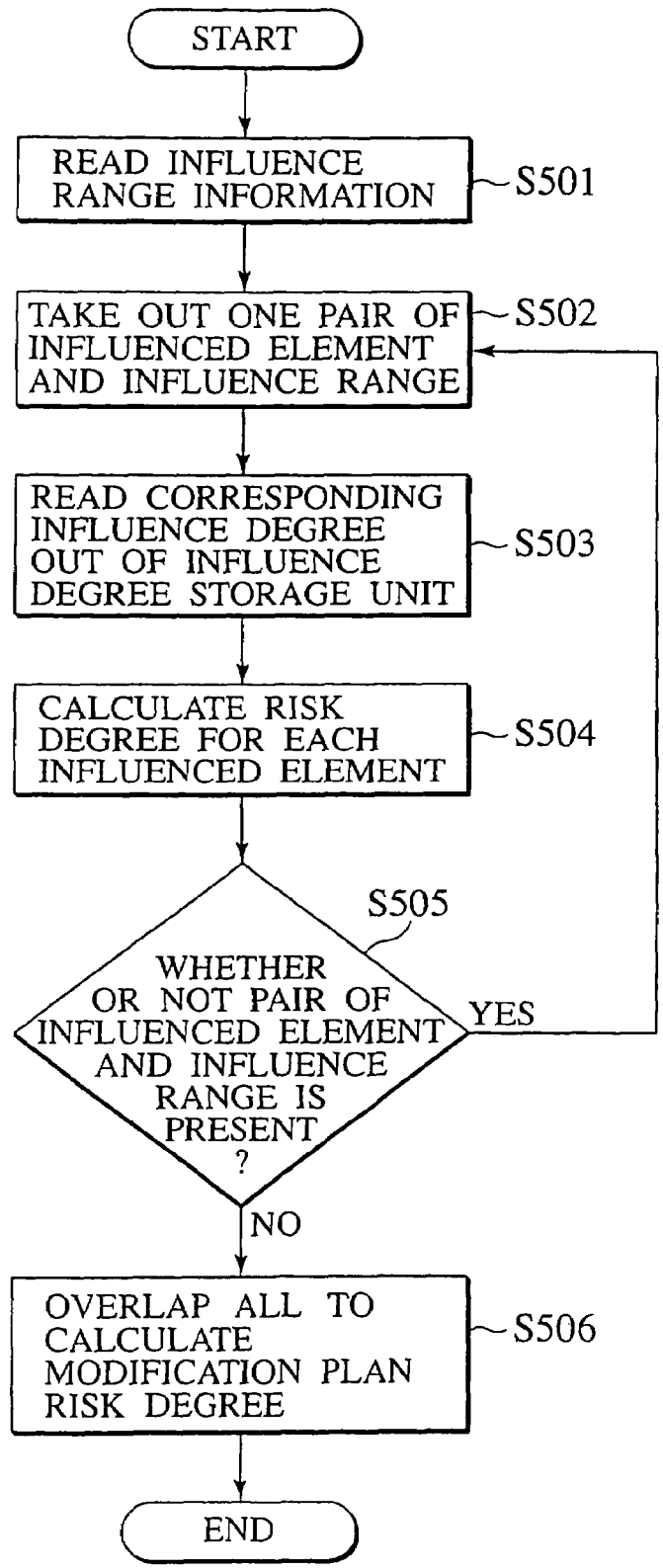
FIG. 11 is a flowchart showing an operation flow of steps for calculating a risk degree according to the embodiment of the present invention.

Next, with reference to FIG. 11, explanation will be made for an operation flow of step S1106 (calculation processing of the risk degree) of FIG. 7.

(a) First, in step S501, the influence range information 9a,9b,9c, . . . are read, and one pair of the influenced element information 8a,8b,8c, . . . and the influence range information 9a,9b,9c, . . . are taken out of the influence range information 9a,9b,9c, . . . (S502). Next, in step S503, the influence degree corresponding to the pair of the influenced element information 8a, 8b, 8c . . . and the influence range information 9a, 9b, 9c . . . are read out of the influence degree storage unit 10.

(b) Next, in step S504, the risk degree for each influenced element information 8a, 8b, 8c . . . are calculated. The risk degree for each influenced element information 8a,8b,8c, . . . are calculated by adding the influence degree and the influence range information 9a,9b,9c, . . . . In calculating the risk degree, in this embodiment, for the specified modification c, a risk degree D(c) is calculated by the following formula using the formula (1), the formula (2) and the formula (3).

$$D(c)=[(C_\rho\rho(c))^2+\Sigma(C_\Delta\Delta(m))^2]^{1/2} \quad (4)$$

The second term in the right-hand side is the sum when the variable m as an element of $\epsilon(c)$ is modified. Moreover, $C_\rho$ and $C_\Delta$ are arbitrary coefficients.

(c) Next, in step S505, a determination is made as to whether or not the currently processed pair of the influenced element information 8a,8b,8c, . . . and the influence range is the last pair, and if the pair is not the last pair, then the process returns to step S502, and the above-described operations are repeated. If the pair is the last pair, the processing exits from the calculation processing.

(d) Finally, in step S506, the entire modification plans 7a are overlapped to calculate the risk degree, and the risk degree is displayed. As a display method of the risk degree, explanation will be made for two display examples in this embodiment.

(1) Display examples for the case where the influence range is narrow though the risk degree is high and the case where the risk degree is low though the influence range is wide As shown in FIG. 16, the case where the influence range is narrow though the risk degree is high is represented as a region A, and the case where the risk degree is low though the influence range is wide is represented as a region B. In this case, the risk degrees in the both parameter groups are set to be low.

(2) Display examples for the case where the way of combination is modified depending on values of the influence range and the influence degree though the way of combining the influence range and the influence degree is not constant In the method shown in FIG. 17, the following definitions are made:

Region A: the risk degree is defined to be 0;

Region B: the risk degree is defined to be equal to the influence range $\rho$;

Region C: the risk degree is defined to be equal to the influence degree $\Delta$;

Region D: the risk degree is defined to be the maximum values of $\rho$ and $\Delta$; and Region E: the risk degree is defined to be 1 (maximum value).

Note that the above-described risk degree displays may be displayed for each risk degree calculation of the influenced element information 8a, 8b, 8c . . . in step S504.

Figure 12:
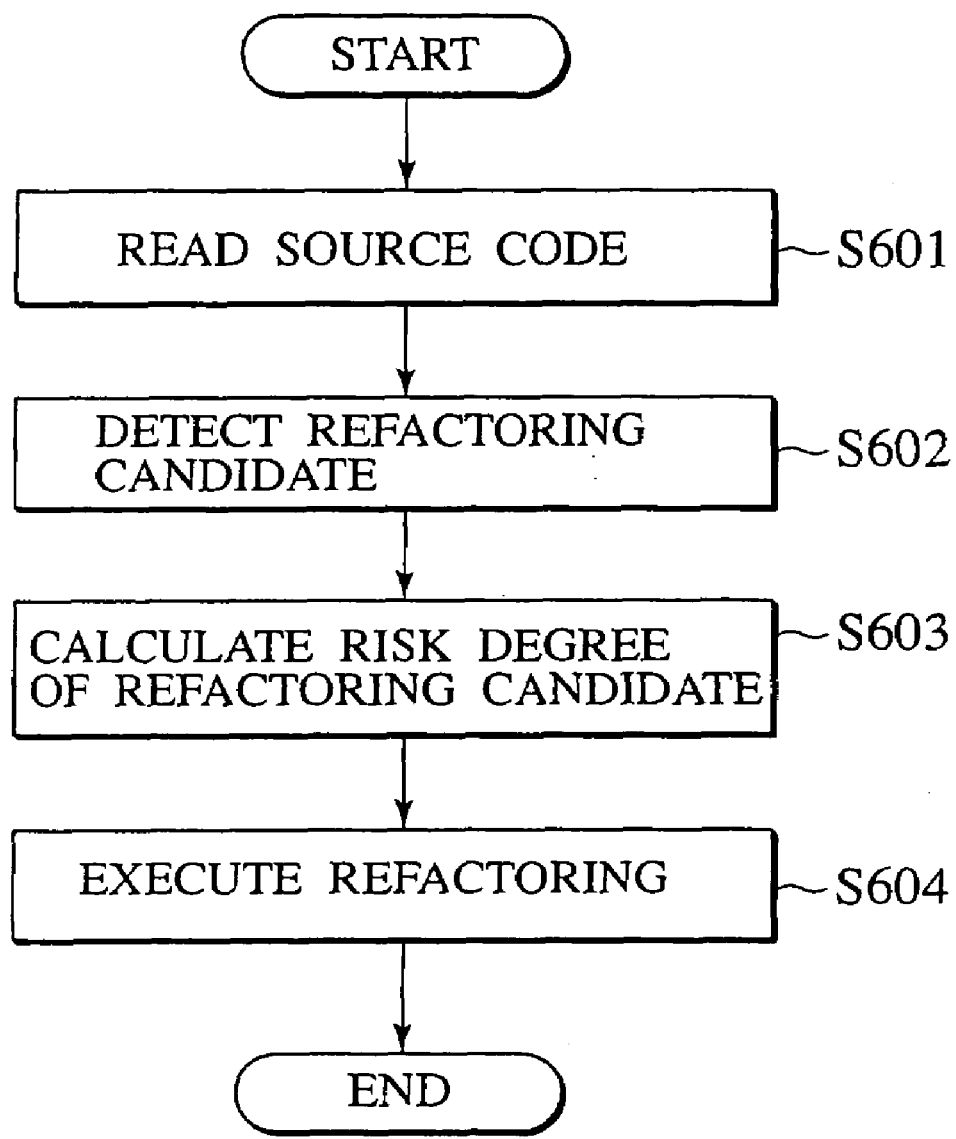
FIG. 12 is a flowchart showing an operation flow of steps for executing re-factoring according to the embodiment of the present invention.

Next, with reference to FIG. 12, explanation will be made for an operation flow of step S107 (assistance processing of the re-factoring) of FIG. 7.

(a) First, in step S601, the source codes 6a, 6b, 6c . . . are read, and in step S602, the re-factoring candidates 51a, 51b, 51c, . . . are explored and extracted. Note that the constitution and procedure for use in step S602 is set similar to the constitution and procedure for use when the modification plans 7a,7b,7c, . . . are prepared, and that the re-factoring candidates 51a,51b,51c, . . . are defined to correspond to the modification plans 7a,7b,7c, . . . .

(b) Next, in step S603, the risk degree of the re-factoring candidates 51a,51b,51c, . . . are calculated based on the source codes 6a,6b,6c, . . . and the re-factoring candidates 51a,51b,51c, . . . . For calculating the risk degree of the re-factoring candidate, the step (S106) and calculation formula for use in the risk degree calculating module 4 is used. When the risk degree of the re-factoring candidate is calculated, the risk degree of the re-factoring candidate is added to the original source codes 6a, 6b, 6c . . . and the risk degree-added re-factoring candidate is prepared.

(c) In step S604, information for assisting the re-factoring execution for the risk degree-added re-factoring candidates 53a, 53b, 53c . . . prepared in step S603 is prepared, added to the risk degree-added re-factoring candidates 53a, 53b, 53c . . . and outputted on the screen of the general-purpose machine. The operator judges the risk degree and reasonability of the re-factoring by the outputted assistance information, and executes the re-factoring.

Note that the "assistance" of the re-factoring according to the present invention indicates modification contents of the modification plan obtained by parsing the source codes 6a,6b,6c, . . . and the modification plans 7a,7b,7c, . . . , a designation of the influence range and influence degree influenced by the requested modification, a correction instruction of the side effect result caused by the modification, an investigation result of a possibility of correcting the side effect result, a judgment of the reasonability of the requested modification plan and a reason thereof, and the like.

(How Modification Risk Degree, Method and Program are Used)

Here, explanation will be made for the function of the present invention by use of a concrete example. FIG. 18 shows a Java program converting an inputted formula into the Reverse Polish Notation. Now here, as the modification plans 7a, 7b, 7c . . . the following two are conceived:

(A) Modification of error( )

The displayed message is partially modified (FIG. 19); and (B) Modification of is Digit( )

The determination order of true/false values is modified (FIG. 20).

Then, these risk degrees are measured.

First, the modification of error( ) of (A) is considered. The influenced element information 8a, 8b, 8c . . . by this modification is only the error( ) itself. Next, when the influence range of this influenced element information 8a, 8b, 8c . . . is investigated, it is understood that the influenced element information 8a, 8b, 8c . . . are used in two regions, match( ) and term( ), and that the occurrence count is two. Therefore, from the formula (2), the influence range of this modification becomes 2.

Next, the influence degree of the influenced element information 8a, 8b, and 8c . . . are quantified. Since the error( ) does not influence the operation of the other elements at all, the influence degree thereof is the minimum. From the formula (3), this influence degree is quantified to be 0. These influence range and influence degree are overlapped to obtain the risk degree. When both values of the arbitrary coefficients $C_\rho$ and $C_\Delta$ are set as 1 and the formula (4) is used, the risk degree becomes 2.

Next, the modification of isDigit( ) of (B) is considered. The influenced element information 8a, 8b, 8c . . . by this modification is the isDigit( ) itself and term( ) utilizing the return value of this method. Next, when the influence range of this influenced element information 8a, 8b, 8c . . . is investigated, the isDigit( ) itself is used in the term( ), and the term( ) is used in four regions in expression( ). Since the influenced element information 8a, 8b, 8c . . . occur once in the term( ) itself and four times in the expression( ), the influence range of this modification becomes 5 from the formula (2).

Next, the influence degree of the influenced element information 8a, 8b, and 8c . . . are quantified. The return value of the isDigit( ) influences the operation of the term( ). Since the variable influencing the operation is 1, from the formula (3), this influence degree is quantified to be 1. These influence range and influence degree are overlapped to obtain the risk degree. When both values of the arbitrary coefficients $C_\rho$ and $C_\Delta$ are set as 1 and the formula (4) is used, the risk degree becomes 6.

As described above, when the modification of (A) and (B) are compared with each other according to the present invention, it is quantitatively evaluated that the latter one is the modification with higher risk degree.

MODIFICATION EXAMPLE

In this embodiment of the present invention, the risk degree is calculated in consideration of both of the influence range and the influence degree. However, when seen from the viewpoint that, since only the information in the source code is used for quantification for both of the influence range and the influence degree, it is apparent that values having determined upper limits are taken, normalization of the influence range and the influence degree can be made based on a ratio of how much the method (class) serving as the influenced element is contained in the entire methods (classes) contained in the source program, and the like. Therefore, for the normalization of the influence range in step S306, the following calculation formula may be used.

In the case of taking the number of methods in which the elements of the set $\epsilon(c)$ of the influenced elements by the specified modification c is present as the influence range, $$\rho_R(c)=\rho(c)/\text{Elms} \quad (5)$$

where Elms is defined as the number of the entire elements in the program.

Moreover, for the normalization of the influence degree in step S403, the following calculation formula may be also used.

$$\Delta_R(m)=(gv(m)+pv(m)+cv(m)+rv(m))/(GV+pv(m)+CV+rv(m)) \quad (6)$$

where gv(m) is the number of external variables used by m, pv(m) is the number of arguments of m, cv(m) is the number of class variables used by m, rv(m) is the number of return values of m, GV is the number of the entire external variables, and CV is the number of the entire class variables. Moreover, when $GV+pv(m)+CV+rv(m)=0$, $\Delta(m)=0$.

It is also possible to obtain the risk degree by substituting the value normalized by the above-described formula (5) and formula (6) into the formula (4).

As described above, according to the present invention, for the respective modification plans present in plural, the extent of the influence degree and the size of the influence range are measured quantitatively, risk degrees are calculated from these pieces of information, and re-factoring is tested, and thus the risk degrees can be used as indices in order to select safer modification plans.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all modification which come within the meaning and range of equivalency of the claims are therefore intended to be embraced therein.

What is claimed is:

1. A modification risk degree measurement system for determining the degree of risk of modification in a program, comprising:
    means for extracting a program constituent element from a program as an influenced element, the program constituent element being influenced by program modification data, and storing the influenced element in an influenced element storage unit;
    means for specifying an influence range from the influenced element and storing the influence range in an influence range storage unit;
    means for determining a degree of influence on the program by the influenced element and storing the degree of influence in an influence degree storage unit; and
    means for calculating a modification risk degree of the program by using the influence range and the degree of influence.

2. A computer system for determining the degree of risk of modification in a program, the computer system comprising:
    a processing unit;
    a computer system memory accessible to the processing unit; and
    a program stored on the computer system memory, wherein the program comprises:
    instructions for extracting a program constituent element from a program as influenced element, the program constituent element being influenced by program modification data, and storing the influenced element in an influenced element storage unit;
    instructions for specifying an influence range from the influenced element, and storing the influence range in an influence range storage unit;
    instructions for determining a degree of influence on the program by the influenced element, and storing the degree of influence in an influence degree storage unit; and
    instructions for calculating a modification risk degree of the program caused by the program modification data by using the influence range and the influence degree.

3. A modification risk degree measurement system for determining the degree of risk of modification in a program, comprising:
    a processor;
    a memory coupled to the processor;
    a software application stored in the memory and executed by the processor, the software application comprising:
    instructions for extracting a program constituent element from a program as influenced element, the program constituent element being influenced by program modification data, and storing the influenced element in an influenced element storage unit;
    instructions for specifying an influence range from the influenced element, and storing the influence range in an influence range storage unit;
    instructions for determining a degree of influence on the program by the influenced element, and storing the degree of influence in an influence degree storage unit; and
    instructions for calculating a modification risk degree of the program caused by the program modification data by using the influence range and the influence degree.

4. A program reconstruction support system for assistance to form a plan for program modifies, comprising:

means for extracting a program constituent element from a program as an influenced element, the program constituent element being influenced by program modification data, and storing the influenced element in an influenced element storage unit;

means for specifying an influence range from the influenced element and storing the influence range in an influence range storage unit;

means for determining a degree of influence on the program by the influenced element and storing the degree of influence in an influence degree storage unit; and means for calculating a modification risk degree of the program by using the influence range and the degree of influence; and means for assisting to refactor a plan for program modification by using information which includes risk degree.

5. A computer system for determining the degree of risk of modification in a program, the computer system comprising:

a processing unit;

a computer system memory accessible to the processing unit; and a program stored on the computer system memory, wherein the program comprises:

instructions for extracting a program constituent element from a program as influenced element, the program constituent element being influenced by program modification data, and storing the influenced element in an influenced element storage unit;

instructions for specifying an influence range from the influenced element, and storing the influence range in an influence range storage unit;

instructions for determining a degree of influence on the program by the influenced element, and storing the degree of influence in an influence degree storage unit;

instructions for calculating a modification risk degree of the program caused by the program modification data by using the influence range and the influence degree; and instructions for assisting to refactor a plan for program modification by using information which includes risk degree.

6. A program reconstruction support system for assistance to form a plan for program modifies, comprising:

a processor;

a memory coupled to the processor;

a software application stored in the memory and executed by the processor, the software application comprising:

instructions for extracting a program constituent element from a program as influenced element, the program constituent element being influenced by program modification data, and storing the influenced element in an influence element storage unit;

instructions for specifying an influence range from the influenced element, and storing the influence range in an influence range storage unit;

instructions for determining a degree of influence on the program by the influenced element, and storing the degree of influence in an influence degree storage unit;

instructions for calculating a modification risk degree of the program caused by the program modification data by using the influence range and the influence degree; and instructions for assisting to refactor a plan for program modification by using information which includes risk degree.

* * * * *